US008715861B2

(12) United States Patent
Suga et al.

(10) Patent No.: US 8,715,861 B2
(45) Date of Patent: May 6, 2014

(54) BIPOLAR SECOND BATTERY WITH TERMINAL PLATE INCLUDING CURRENT SUPPRESSING DEVICE, BATTERY PACK AND VEHICLE EQUIPPED WITH THE SAME

(75) Inventors: Sohei Suga, Yokohama (JP); Masanori Aoyagi, Yokohama (JP); Kenji Ohara, Yokohama (JP); Yasuo Ohta, Yokohama (JP); Junji Katamura, Kawasaki (JP); Motoharu Obika, Yokohama (JP); Kenji Hosaka, Yokosuka (JP); Hideaki Horie, Yokosuka (JP); Shigeo Watanabe, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 396 days.

(21) Appl. No.: 13/122,259

(22) PCT Filed: Oct. 19, 2009

(86) PCT No.: PCT/IB2009/007157
§ 371 (c)(1),
(2), (4) Date: Apr. 1, 2011

(87) PCT Pub. No.: WO2010/046745
PCT Pub. Date: Apr. 29, 2010

(65) Prior Publication Data
US 2011/0183166 A1 Jul. 28, 2011

(30) Foreign Application Priority Data

Oct. 20, 2008 (JP) .................... 2008-270088
Jul. 6, 2009 (JP) .................... 2009-160098

(51) Int. Cl.
*H01M 2/22* (2006.01)
*H01M 2/30* (2006.01)
*H01M 4/70* (2006.01)
*H01M 10/42* (2006.01)

(52) U.S. Cl.
USPC .............. 429/234; 429/61; 429/178; 429/179; 429/233

(58) Field of Classification Search
USPC ........................... 429/61, 178, 179, 233, 234
See application file for complete search history.

(56) References Cited

FOREIGN PATENT DOCUMENTS

| JP | H06-231749 A | 8/1994 |
|---|---|---|
| JP | 2003-243038 A | 8/2003 |

(Continued)

OTHER PUBLICATIONS

Hosaka et al., Machine translation of JP 2008-159570 A, Jul. 2008.*

(Continued)

*Primary Examiner* — Sean P Cullen
(74) *Attorney, Agent, or Firm* — Global IP Counselors, LLP

(57) ABSTRACT

A bipolar secondary battery is provided with an electric power generating unit, a pair of terminal plates. The electric power generating unit includes a plurality of bipolar electrodes stacked on one another with an electrolyte layer disposed between the bipolar electrodes and separating the bipolar electrodes. Each of the bipolar electrodes includes a collector with a positive electrode active material layer formed on a first side surface of the collector, and a negative electrode active material layer formed on a second side surface of the collector. The first terminal plate is connected to a first stacking direction facing end of the electric power generating unit. The second terminal plate is connected to a second stacking direction facing end of the electric power generating unit. At least one of the terminal plates includes an electric current suppressing device that suppresses an electric current occurring when an internal short circuit occurs in the electric power generating unit.

10 Claims, 21 Drawing Sheets

(56) References Cited

FOREIGN PATENT DOCUMENTS

| JP | 2004355953 A | * | 12/2004 |
| JP | 2005-174691 A | | 6/2005 |
| JP | 2008159570 A | * | 7/2008 |
| JP | 2009-016235 A | | 1/2009 |

OTHER PUBLICATIONS

Fukuzawa et al., Machine translation of JP 2004-355953 A, Dec. 2004.*

An English translation of the Chinese Written Notification of Opinion Upon First Examination of corresponding Chinese Application No. 200980141657.7, issued on Apr. 2, 2013.

An English translation of the Korean Notification of Submission of Opinions of corresponding Korean Application No. 10-2011-7008879, issued on Feb. 25, 2013.

An English translation of the Chinese Written Notification of Opinion Upon Second Examination for the corresponding Chinese patent application No. 200980141657.7 issued on Oct. 21, 2013.

* cited by examiner

US 8,715,861 B2

BIPOLAR SECOND BATTERY WITH TERMINAL PLATE INCLUDING CURRENT SUPPRESSING DEVICE, BATTERY PACK AND VEHICLE EQUIPPED WITH THE SAME

CROSS-REFERENCE TO RELATED APPLICATIONS

This U.S. National stage application claims priority to Japanese Patent Application Nos. 2008-270088, filed on Oct. 20, 2008 and 2009-160098, filed on Jul. 6, 2009. The entire disclosures of Japanese Patent Application Nos. 2008-270088 and 2009-160098 are hereby incorporated herein by reference.

BACKGROUND

1. Field of the Invention

The present invention generally relates to a bipolar secondary battery. More specifically, the present invention relates to a bipolar secondary battery that suppresses or interrupts a localized concentration of current in a terminal plate of a bipolar secondary battery resulting from an internal short circuit in the bipolar secondary battery.

2. Background Information

In recent years, there is an urgent need to reduce the amount of carbon dioxide emitted to the atmosphere in order to protect the environment. As the automotive industry looks increasingly to electric vehicles and hybrid electric vehicles as a means of reducing carbon dioxide emissions, bipolar secondary batteries are attracting attention as an electric power source for the electric motors that propel such vehicles. The electric power source is the key to making electric and hybrid electric vehicles practical.

When a bipolar secondary battery is overcharged or incurs a mechanical shock (impact) from the outside, a short circuit typically occurs inside the bipolar secondary battery. Since the energy density of the bipolar secondary batteries currently used is large, an internal short circuit occurring inside the bipolar secondary battery causes localized heating at the portion where the internal short circuit occurred. Since a bipolar secondary battery includes a positive electrode active material layer, a collector, a negative electrode active material layer, and a dielectric layer laminated closely together, localized heating can not readily cool and heat tends to linger in portions where internal short circuits occur.

In order to alleviate the problem of increased temperatures caused by short circuiting in lithium-ion secondary batteries, there is a technology that uses an extremely thin film of aluminum on a positive electrode collector. With that technology, when a short circuit current flows in the positive electrode collector, the thin film of aluminum heats due to the current and disperses the heat, thereby restoring the insulation of the portion where the short circuit occurred and preventing the temperature of the battery from increasing (See, Japanese Laid-Open Patent Publication No. 2003-243038).

In view of the above, it will be apparent to those skilled in the art from this disclosure that there exists a need for an improved bipolar secondary battery. This invention addresses this need in the art as well as other needs, which will become apparent to those skilled in the art from this disclosure.

SUMMARY

It has been discovered that the technology presented in Japanese Laid-Open Patent Publication No. 2003-243038 is not tailored to bipolar secondary batteries. A bipolar secondary battery includes a plurality of bipolar electrodes stacked (laminated) on one another with electrolyte layers in between, and each of the bipolar electrodes includes a single collector having a positive electrode active material layer formed on one side and a negative electrode active material layer formed on the other. Thus, a single cell battery is formed by each combination of a positive electrode active material layer and a negative electrode active material layer with an electrolyte layer in between and a plurality of such single cells stacked together in series forms an electric power generating unit. Terminal plates serving as leads for carrying electric power from the plurality of single cells (i.e., the electric power generating unit) to the outside are arranged on opposite stacking direction-facing terminal ends of plurality of single cells.

If a short circuit that reaches a terminal plate (i.e., collector plate) at a terminal end of the electric power generating unit occurs in this kind of bipolar secondary battery, then a concentrated current will continue to flow through the terminal plate without stopping even if a collector inside the battery disperses the short circuit current. Consequently, there is a possibility that the temperature of the entire battery will continue to rise. Therefore, when the existing technology related to a single layer battery presented in Japanese Laid-Open Patent Publication No. 2003-243038 is applied to a bipolar secondary battery, the temperature of the entire battery cannot be prevented from rising when a short circuit current caused by an internal short circuit occurs.

In view of the state of the known technology, one object is to provide a bipolar secondary battery that can prevent an occurrence of a concentration of current in a terminal plate caused by an internal short circuit in the bipolar secondary battery. The present invention can be utilized as a technology for improving the reliability of bipolar secondary batteries.

According to one aspect, a bipolar secondary battery is provided that basically comprises an electric power generating unit and a pair of terminal plates. The electric power generating unit includes a plurality of bipolar electrodes stacked on one another with an electrolyte layer disposed between the bipolar electrodes and separating the bipolar electrodes. Each of the bipolar electrodes includes a collector with a positive electrode active material layer formed on a first side surface of the collector, and a negative electrode active material layer formed on a second side surface of the collector. The first terminal plate is connected to a first stacking direction facing end of the electric power generating unit. The second terminal plate is connected to a second stacking direction facing end of the electric power generating unit. At least one of the terminal plates includes an electric current suppressing device that suppresses an electric current occurring when an internal short circuit occurs in the electric power generating unit.

These and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
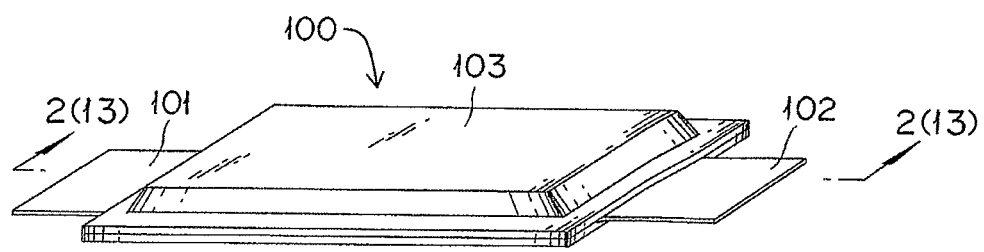
FIG. 1 is a perspective view of a bipolar secondary battery, especially usefully in a vehicle battery pack, that contains a plurality of the bipolar secondary batteries.

Selected embodiments will now be explained with reference to the drawings. Elements having the same functions are indicated in the drawings with the same reference numerals and duplicate explanations thereof are omitted. It will be apparent to those skilled in the art from this disclosure that the following descriptions of the embodiments are provided for illustration only and not for the purpose of limiting the invention as defined by the appended claims and their equivalents. The dimensions and proportional sizes of the parts are only provided for emphasis or simplification. Actual dimensions and proportional sizes may differ from those presented herein. The present invention can be applied to any battery having a bipolar secondary battery structure, e.g., a lithium ion battery, a lithium ion secondary battery, a nickel chloride battery, a solid polymer fuel cell, or a solid oxide fuel cell. In the embodiments described below, the bipolar secondary battery is a bipolar lithium ion secondary battery (hereinafter referred to as simply a "bipolar secondary battery"). As explained below, the bipolar secondary battery structure of the illustrated embodiments have terminal plates that are configured to suppress or interrupt a concentration of current occurring in a terminal plate. Thus, if an internal short circuit that reaches a terminal plate occurs, then a concentrated localized current occurring in the terminal plate can be suppressed or prevented. Therefore, a temperature increase occurring in the battery due to an internal short circuit can be prevented.

First Embodiment

Figure 2:
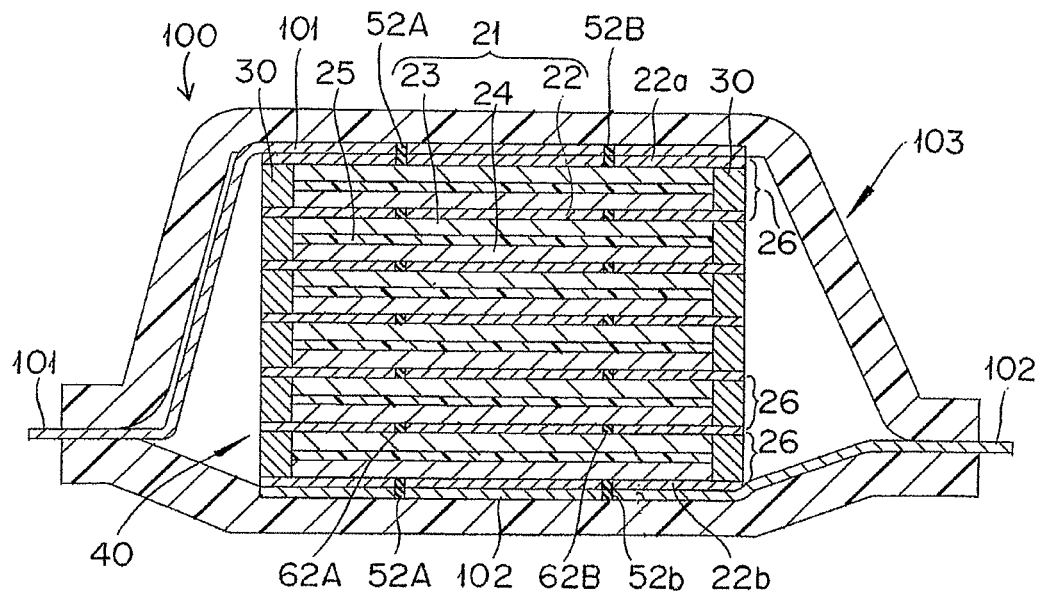
FIG. 2 is a cross sectional view of the bipolar secondary battery shown in FIG. 1 as seen along the section line 2-2 in accordance with the first to third embodiments.

FIG. 1 shows the outside appearance of a bipolar secondary battery according to a first embodiment. FIG. 2 is a cross sectional view taken of the bipolar secondary battery as seen along section line 2-2 in FIG. 1. As shown in FIG. 1, the bipolar secondary battery 100 has a generally flat shape. The bipolar secondary battery 100 has a positive electrode terminal plate 101, a negative electrode terminal plate 102 and an outer covering 103. The positive electrode terminal plate 101 extends out of a first side of the outer covering 103. The negative electrode terminal plate 102 extends out of a second side of the outer covering 103 that is opposite the first side of the outer covering 103. The bipolar secondary battery 100 also has an electric power generating unit 40, which can be referred to as an "electric power generating means for generating electric power" constructed as shown in FIG. 2. The outer covering 103 is configured and arranged to enclose the electric power generating unit 40. The outer covering 103 is thermally fused around its periphery to hermetically seal the electric power generating unit 40 in a substantially vacuum state and prevent outside air from entering.

Figure 3A:
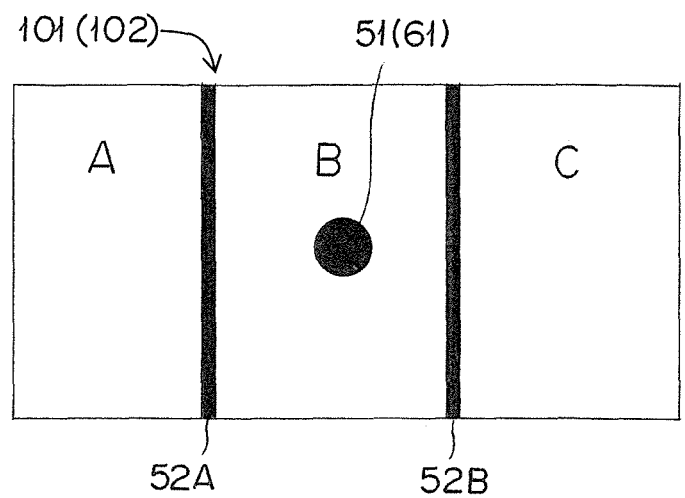
FIG. 3A is a schematic illustration of an arrangement of rectifying elements or fuses that are provided on the positive and negative electrode terminal plates shown in FIG. 2 as viewed along a stacking direction in accordance with the first embodiment.
Figure 3B:
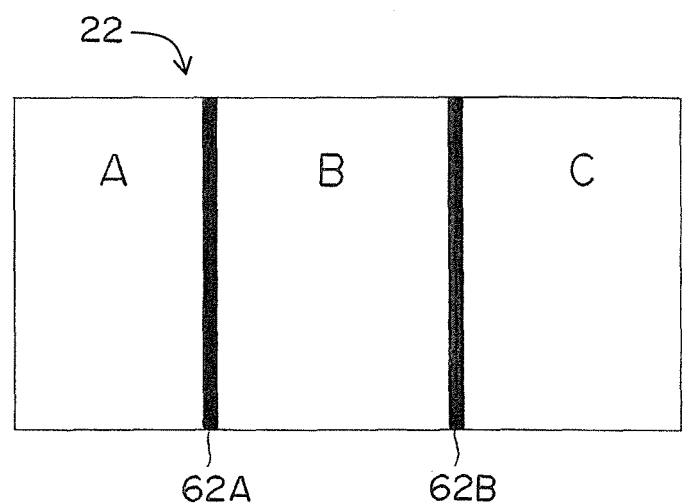
FIG. 3B is a schematic illustration of an arrangement of insulating members that are provided in an electric power generating unit shown in FIG. 2 as viewed along the stacking direction in accordance with the first embodiment.

FIG. 3A shows an arrangement of a rectifying element or a fuse provided on a positive electrode terminal plate and a negative electrode terminal plate shown in FIG. 2 as viewed along a stacking direction. FIG. 3B shows an arrangement of an insulating member provided on the electric power generating unit 40 shown in FIG. 2 as viewed along the stacking direction.

As shown in FIG. 2, the electric power generating unit 40 includes a plurality of bipolar electrodes 21 laminated together with electrolyte layers 25 arranged alternately between the bipolar electrodes 21. Each of the bipolar electrodes 21 includes a collector 22, a positive electrode active material layer 23 formed on one side surface of the collector 22, and a negative electrode active material layer 24 formed on another side surface of the collector 22. A single cell 26 is formed by each combination of the positive electrode active material layer 23, the electrolyte layer 25, and the negative electrode active material layer 24 sandwiched between two collectors 22. Peripheral portions of the single cells 26 are each provided with an annular sealing part 30 that prevents outside air from contacting the positive electrode active material layers 23, the electrolyte layers 25, and the negative electrode active material layers 24 of the single cell 26.

Although the electric power generating unit 40 shown in FIG. 2 has six of the single cells 26, the number of the single cells 26 can be selected as necessary depending on the required voltage and capacity required.

As shown in FIG. 2, the outermost layer at one stacking direction-facing end of the electric power generating unit 40 is formed by one of the collectors 22 (i.e., the outermost collector 22a). The outermost collector 22a has the positive electrode active material layer 23 on its interior side thereof. The outermost layer at the other stacking direction-facing end of the electric power generating unit 40 is formed by one of the collectors 22 (i.e., the outermost collector 22b). The outermost collector 22b has the negative electrode active material layer 24 on its interior side thereof. In this embodiment, the outermost collectors 22a and 22b arranged at both stacking direction-facing ends of the electric power generating unit 40 have the positive electrode active material layer 23 or the negative electrode active material layer 24 on only one side thereof. However, it is also acceptable to use bipolar electrodes 21 having the positive electrode active material layer 23 on one side and the negative electrode active material layer 24 on the other side (the same as rest of the bipolar electrodes 21 used in the electric power generating unit 40) as the outermost layers of both stacking direction-facing ends of the electric power generating unit 40.

The positive electrode terminal plate 101 is electrically connected to the outermost collector 22a, while the negative electrode terminal plate 102 is electrically connected to the outermost collector 22b for drawing current out of the electric power generating unit 40. Thus, the positive electrode terminal plate 101 and the negative electrode terminal plate 102 can be referred to as "terminal means for providing connections for the electric power generating means." The outermost collector 22a is attached to the positive electrode terminal plate 101 by using welding or another joining method at a prescribed location such that a connection that is electrically and mechanically secure is obtained. Likewise, the outermost collector 22b is attached to the negative electrode terminal plate 102 by using welding or another joining method at a prescribed location such that a connection that is electrically and mechanically secure is obtained. It is acceptable for the prescribed location to be a center position of the connection between the outermost collector 22a and the positive electrode terminal plate 101. Likewise, it is acceptable for the prescribed location to be a center position of the connection between the outermost collector 22b and the negative electrode terminal plate 102. It is also acceptable for the prescribed locations to be offset from the center positions toward the direction in which the positive electrode terminal plate 101 or the negative electrode terminal plate 102 extends outward. The position where the outermost collector 22a is joined to the positive electrode terminal plate 101 and the position where the outermost collector 22b is joined to the negative electrode terminal plate 102 are called "current lead connection positions" in this specification.

As shown in FIG. 3A, a portion of the positive electrode terminal plate 101 where the positive electrode terminal plate 101 and the outermost collector 22a overlap, as viewed along the stacking direction, and a portion of the negative electrode terminal 102 where the negative electrode terminal plate 102 and the outermost collector 22b overlap, as viewed along the stacking direction, are each provided with two rectifying elements or fuses 52A and 52B that partition the terminal plates 101 and 102 into three regions A, B, and C. The three regions A, B, and C are electrically connected (linear connection) to one another at the borders therebetween through the rectifying elements or fuses 52A and 52B.

When an internal short circuit occurs in the electric power generating unit 40, the rectifying elements or fuses 52A and 52B serve to limit the size of a current flowing in a planar direction of the terminal plates 101 and 102 along the outermost collectors 22a and 22b, respectively, between the different regions A, B, and C, and/or to interrupt (stop) a current flowing in the planar direction of the terminal plates 101 and 102 along the outermost collectors 22a and 22b, respectively, between the different regions A, B, and C. For example, when an internal short circuit occurs in the region A and current flows from the region B toward the region A in the plane of the collector, the rectifying element or fuse 52A acts to either limit the size of or interrupt the current. Thus, the rectifying elements or fuses 52A and 52B can be referred to as "an electric current suppressing means for suppressing an electric current occurring when an internal short circuit occurs in the electric power generating means."

In this embodiment, the rectifying elements or fuses 52A and 52B are provided on both the positive electrode terminal plate 101 and the negative electrode terminal plate 102. However, it is also acceptable to provide rectifying elements or fuses 52A and 52B on only the positive electrode terminal plate 101 or the negative electrode terminal plate 102.

As shown in FIG. 3B, the collector 22 of each of the bipolar electrodes 21 is provided with two insulating members 62A and 62B (insulating devices) that partition the collector 22 into three regions A, B, and C along a planar direction of the collector 22. The insulating members 62A and 62B are configured to interrupt a current flowing in the collector 22 between the partitioned regions A, B, and C. Thus, due to the action of the insulating members 62A and 62B, the single cells 26 are equivalent to six single cells 26 that each comprise three regions A, B, and C and are connected together in parallel.

The positions of the rectifying elements or fuses 52A and 52B provided on the positive and negative electrode terminal plates 101 and 102 and the positions of the insulating members 62A and 62B provided on the collectors 22 of the bipolar electrodes 21 are substantially identical (aligned) when the electric power generating unit 40 is viewed along the stacking direction. By arranging (aligning) the rectifying elements or fuses 52A and the insulating members 62A in identical positions and arranging (aligning) the rectifying elements or fuses 52B and the insulating members 62B in identical positions, a region in which an internal short circuit occurs can be isolated from other regions that are functioning properly. As a result, a situation in which a localized current continues to flow can be avoided and localized heating can be suppressed.

When the probability that an internal short circuit will occur is not related to the shape or arrangement of the bipolar secondary battery 100, it is preferable for the surface areas of the three regions A, B, and C to be equal. Meanwhile, if, for example, the probability that an internal short circuit will occur is larger at an edge portion of the bipolar secondary battery, then the surface area of the region B is set to be larger than the surface area of the regions A and C. By reducing the surface area of a region where the probability of an internal short circuit is high, the size of the current that flows when an internal short circuit occurs can be reduced and the amount of heat generated by the current can be reduced.

Although in this embodiment insulating members 62A and 62B are provided on all of the collectors 22 making up the bipolar electrodes 21, it is also acceptable if insulating members 62A and 62B are not provided on all of the collectors 22. For example, insulating members 62A and 62B could be provided on every other collector 22 along the stacking direction.

The component elements of the electric power generating unit 40 according to this embodiment will now be explained. The positive electrode active material layers 23 is a positive electrode that includes a positive electrode active material. The positive electrode can also include a conductivity enhancer, a binder, and the like that are made to thoroughly permeate the positive electrode. For example, a gel electrolyte using chemical bridging or physical bridging can be used to thoroughly permeate the positive electrode.

The positive electrode active material can be a complex oxide of a transition metal and lithium like that used in a solution-type lithium ion battery. More specifically, $LiCoO_2$ or another complex oxide of lithium and cobalt, $LiNiO_2$ or another complex oxide of lithium and nickel, $LiMn_2O_4$ or another complex oxide of lithium and manganese, or $LiFeO_2$ or another complex oxide of lithium and iron can be used. Additionally, such materials as a sulfate compound, a complex oxide of lithium and phosphorous (e.g., $LiFePO_4$), an oxide or sulfide of a transition metal (e.g., $V_2O_5$, $MnO_2$, $TiS_2$, $MoS_2$, and $MoO_3$), or such compounds as $PbO_2$, $AgO$, and $NiOOH$ can be used.

From a manufacturing standpoint, the particle diameter (particle size) of the positive electrode active material should be such that the positive electrode material can be made into a paste and applied by spray coating to as to form a film. Additionally, in order to reduce the electrical resistance of the positive electrode, the particle size should be smaller than a particle size typically used a solution-type lithium ion battery in which the electrolyte is not a solid. More specifically, the average particle diameter of the positive electrode active material should be from 0.1 to 10 μm.

A polymer gel electrolyte is generally a solid polymer electrolyte having an ion conductive property that contains an electrolyte solution typically used in a lithium ion battery, but a polymer gel electrolyte can also be obtained by embedding an electrolyte solution into the molecular framework of a polymer that does not have an ion conductive property.

The electrolyte solution (electrolyte salt and plasticizer) contained in the polymer gel electrolyte should be an electrolytic solution typically used in a lithium ion battery. For example, the electrolyte solution can contain at least one lithium salt (electrolyte salt) selected from among such inorganic acid anionic salts as $LiPF_6$, $LiBF_4$, $LiClO_4$, $LiAsF_6$, $LiTaF_6$, $LiAlCl_4$ and $Li_2B_{10}Cl_{10}$ and such organic acid anionic salts as $LiCF_3SO_3$, $Li(CF_3SO_2)_2N$, and $Li(C_2F_5SO_2)_2$ N. The electrolyte solution can also use an aprotic solvent or other organic solvent (plasticizer) comprising at least one of or a mixture of two or more organic solvents selected from among such ring carbonates as propylene carbonate and ethylene carbonate; such chain carbonates as dimethyl carbonate, methylethyl carbonate, and diethyl carbonate; such ethers as tetrahydrofuran, 2-methyltetrahydrofuran, 1,4-dioxane, 1,2-dimetoxyethane, and 1,2-dibutoxyethane; such lactones such as γ-butyrolactone; such nitriles as acetonitrile; such esters as methyl propionate; such amides as dimethylformamide; methyl acetate; and methyl formate. However, the electrolyte solution is not limited to these electrolyte salts and organic solvents.

Examples of a polymer having an ion conductive property include polyethylene oxide (PEO), polypropylene oxide (PPO), and copolymers of PEO and PPO. Examples of polymers not having a lithium ion conductive property that can be used as the polymer gel electrolyte include polyvinylidene fluoride (PVDF), polyvinyl chloride (PVC), polyacrylonitrile (PAN), and polymethyl methacrylate (PMMA). However, the polymer to be used is not limited to these polymers. PAN and PMMA can be more precisely categorized as polymers having very little ionic conductivity (as apposed to none) and, thus, can also be categorized as polymers that do have an ion conductive property. However, in this embodiment, PAN and PMMA are presented as examples of polymers that have no lithium ion conductivity and can be used in the polymer gel electrolyte. Examples of the aforementioned lithium salts include such inorganic acid anionic salts as $LiPF_6$, $LiBF_4$, $LiClO_4$, $LiAsF_6$, $LiTaF_6$, $LiAlCl_4$ and $Li_2B_{10}Cl_{10}$, such organic acid anionic salts as $Li(CF_3SO_2)_2N$ and $Li(C_2F_5SO_2)_2N$, and mixtures of any of these. However, the lithium salt to be used is not limited to these lithium salts. Examples of the conductivity enhancer include acetylene black, carbon black, and graphite. However, the conductivity enhancer to be used is not limited to these substances.

In this embodiment, the electrolyte solution, the lithium salt, and the polymer are mixed together to form a pre-gel solution and the pre-gel solution is impregnated into the positive electrode. For the positive electrode, the mixing proportions of the positive electrode active material, the conductivity enhancer, and the binder should be determined in view of the application for which the battery will be used (e.g., output versus energy) and the ionic conductivity. For example, particularly in the case of a solid polymer electrolyte, if the proportion of electrolyte in the positive electrode is too small, then an ion conduction resistance and an ion diffusion resistance will increase inside the active material layer and the battery performance will decline. Meanwhile, particularly in the case of a solid polymer electrolyte, if the proportion of electrolyte in the positive electrode is too large, then the energy density of the battery will decline. In view of these factors, the amount of solid polymer electrolyte should be determined according to the objective of the battery.

While there are no particular limitations on the thickness of the positive electrode, similarly to the mixing proportions, the thickness should be determined in view of the application for which the battery will be used (e.g., output versus energy) and the ionic conductivity. A typical thickness of the positive electrode active material layer is from 10 to 500 μm.

The negative electrode includes a negative electrode active material. The negative electrode can also include a conductivity enhancer, a binder, and the like. Other than the type of material used as the negative electrode active material, the negative electrode is basically the same as the positive electrode and explanations of aspects that are the same will omitted.

A negative electrode active material used in a solution-type lithium ion battery can be used as the negative electrode active material. Preferred examples include metal oxides, lithium-metal complex oxides, and carbon. More preferable examples include, carbon, transition metal oxides, and lithium-transition metal complex oxides. Even more preferable examples include titanium oxides, complex oxides of lithium and titanium, and carbon. It is acceptable to use either one of these substances or a combination of two or more.

In this embodiment, a battery with superior capacity and output characteristics can be obtained by using a complex oxide of lithium and a transition metal as the positive active material of the positive electrode active material layer and using carbon or an oxide of lithium and a transition metal as the negative active material of the negative electrode active material layer.

The electrolyte layer 25 is a layer made of a polymer having an ion conductive property. There are no particular limitations on the material so long as it exhibits an ion conductive property. In this embodiment, the electrolyte of the electrolyte layer 25 is a polymer gel electrolyte made by impregnating a separator used as a base material with a pre-gel solution and allowing the polymer gel electrolyte to form by chemical bridging or physical bridging. Thus, the polymer gel electrolyte is a all-solid polymer electrolyte having an ion conductive property (e.g., polyethylene oxide (PEO)) that contains an electrolyte solution typically used in lithium-ion batteries. It is also acceptable for the polymer to be polyvinylidene fluoride (PVDF) or another polymer that does not have a lithium ion conductive property and the polymer gel electrolyte to be obtained by embedding an electrolyte solution typically used in lithium-ion batteries into the molecular framework of the polymer. The same polymer gel electrolyte presented as an example of the electrolyte contained in the positive electrode can also be used in the negative electrode and an explanation thereof is omitted here. A wide range of proportions of polymer and electrolyte can be used in the polymer gel electrolyte. Assuming that 100% polymer is a all-solid polymer electrolyte and 100% electrolyte solution is a liquid electrolyte, then any material obtained with proportions in between is a polymer gel electrolyte. The term "polymer electrolyte" includes both polymer gel electrolytes and all-solid polymer electrolytes. Ceramic and other inorganic solid electrolytes having an ion conductive property are also all-solid electrolytes.

As explained above, polymer gel electrolytes can be used in the positive electrode and the negative electrode in addition to being used as a polymer electrolyte forming the battery. The polymer electrolyte used for making the battery can be either different from or the same as the polymer electrolytes used in the positive and negative electrodes. It is also acceptable for different polymer electrolytes to be used in different layers of the bipolar secondary battery 100. The polymer gel electrolytes, the solid polymer electrolytes, and the inorganic solid electrolytes are referred to collectively as "solid electrolytes." There are no particular limitations on the thickness of the electrolyte making up the battery. However, in order to obtain a compact bipolar secondary battery, it is preferable for the electrolyte to be as thin as possible while still being able to perform its function as an electrolyte. A typical thickness of a solid polymer electrolyte layer is from 10 to 100 μm. However, the shape of the electrolyte can be varied utilizing the characteristics of the manufacturing method, e.g., the electrolyte can easily be deposited as a film onto peripheral portions of an upper surface and a side surface of an electrode (positive electrode or negative electrode), and it is not necessary to make the thickness substantially the same everywhere in order to ensure the function and performance of the electrolyte.

By using a solid electrolyte for the electrolyte layers of the bipolar secondary battery 100, liquid leakage can be prevented, liquid junction (which is a problem unique to bipolar secondary batteries) can be prevented, and a highly reliable bipolar secondary battery can be obtained. Additionally, the structure of the sealing parts 30 can be simplified because there is no liquid leakage. Consequently, the bipolar secondary battery can be fabricated more easily and the reliability of the secondary bipolar battery can be increased.

Examples of solid electrolytes include such known solid polymer electrolytes as polyethylene oxide (PEO), polypropylene oxide (PPO), and copolymers thereof. A supporting salt (lithium salt) is contained in the solid polymer electrolyte layer to secure an ion conductive property. Such compounds as $LiBF_4$, $LiPF_6$, $LiN(SO_2CF_3)_2$, and $LiN(SO_2C_2F_5)_2$ or a mixture of these can be used as the supporting salt. However, the supporting salt to be used is not limited to these substances. The compounds $LiBF_4$, $LiN(SO_2CF_3)_2$, and $LiN(SO_2C_2F_5)_2$ dissolve readily in such polyalkylene oxide polymers such as PEO and PPO. Additionally, the formation of a bridged structure provides a superior mechanical strength.

The sealing parts 30 serve to protect the electric power generating unit 40 from contact with outside air, thereby preventing the ion conductivity of the electrolyte from declining. The electrolyte used is not only a liquid electrolyte or semi-solid gel electrolyte but also a solid electrolyte. The sealing parts 30 prevent the active material from reacting with air or moisture contained air. The sealing parts 30 also prevent liquid leakage and liquid junctions, which can occur when a liquid or semi-solid gel electrolyte is used. As a seal precursor, it is favorable to use a rubber resin that has been made to adhere closely to the collector 22 by being compressively deformed or a thermally fusible resin (e.g., olefin) that has been made to adhere closely to the collector 22 by being heated and compressed. While there are no particular limitations on the rubber resins that can be used, it is preferable to use a rubber resin selected from among the group comprising silicon rubbers, fluorine rubbers, olefin rubbers, and nitrile rubbers. These rubber resins have excellent sealing performance, alkaline resistance, chemical resistance, durability, weather resistance, and heat resistance and can be used for a long period of time without these excellent properties or the quality of the resin becoming degraded.

There are no particular limitations on the thermally fusible resins that can be used so long as the resin can be used as the sealing parts 30 in the electric power generating unit 40 and so long as the resin exhibits an excellent sealing effect in all conditions under which the electric power generating unit 40 will be used. A thermally fusible resin is preferably selected from the group comprising silicon, epoxy, urethane, polybutadiene, olefin resins (e.g., polypropylene and polyethylene), and paraffin wax. These thermally fusible resins have excellent sealing performance, alkaline resistance, chemical resistance, durability, weather resistance, and heat resistance and can be used for a long period of time without these excellent properties or the quality of the resin becoming degraded.

As shown in FIG. 3A, the material used to form the regions A, B, and C of the positive electrode terminal plate 101 is the same as the material used to form the outermost collector 22a. Also the material is used to form the regions A, B, and C of the negative electrode terminal plate 102 is the same as the material used to form the outermost collector 22b. In this embodiment, there are no particular limitations on the material that can be used for the terminal plates and the collector and a well-known existing material can be used. For example, aluminum and stainless steel (SUS) can be used favorably. As shown in FIG. 3A, the rectifying elements or fuses 52A and 52B are must be formed on the positive terminal plate 101 or the negative terminal plate 102 in a linear form at intermediate positions of the outermost collector 22a or the outermost collector 22b. Consequently, if a rectifying element is formed, then a silicon-based material that can be used to form an N-type or P-type semiconductor is used as the material for the rectifying element. If a fuse is formed, then a metal having a low melting point, i.e., an appropriate melting temperature, is used as the material for the fuse.

The positive electrode terminal plate 101 and the negative electrode terminal plate 102 can be fabricated by depositing the aforementioned material onto a substrate using an inkjet method. For example, the material forming the collector in the regions A, B, and C and the N-type or P-type semiconductor material forming the rectifying elements 52A and 52B can each be deposited separately in a linear form. When linearly shaped fuses 52A and 52B are to be formed, the material forming the fuses 52A and 52B is deposited in a linear form. Thus, the region A functioning as a terminal plate, the linear region functioning as a rectifying element or fuse, the region B functioning as a terminal plate, the other linear region functioning as a rectifying element or fuse, and the region C functioning as a terminal plate can each be formed as explained above.

When the positive electrode terminal plate 101 or the negative electrode terminal plate 102 is formed as a simple terminal plate (i.e., without a linearly shaped rectifying element or fuse), the terminal plate can be made using such preferred materials as aluminum foil, stainless (SUS) foil, nickel and aluminum cladding, copper and aluminum cladding, or a plating made of a combination of these metals. It is also acceptable to make the terminal plate by depositing a film of aluminum on a metal surface. Also, in some situations, a terminal plate made by laminating two or more metal foils together can be used. Although there are no particular limitations on the thickness of the positive electrode terminal plate 101 and the negative electrode terminal plate 102, the thickness is generally from 1 to 100 μm.

The collectors 22 can be fabricated by using an aluminum oxide as an insulator of a substrate and using a composite resin made of acetylene black and polyethylene as a conductor. An example of a method of fabricating the collector 22 will now be explained with reference to FIG. 4. However, the collectors 22 are not limited to the materials and fabrication method presented here.

Figure 4:
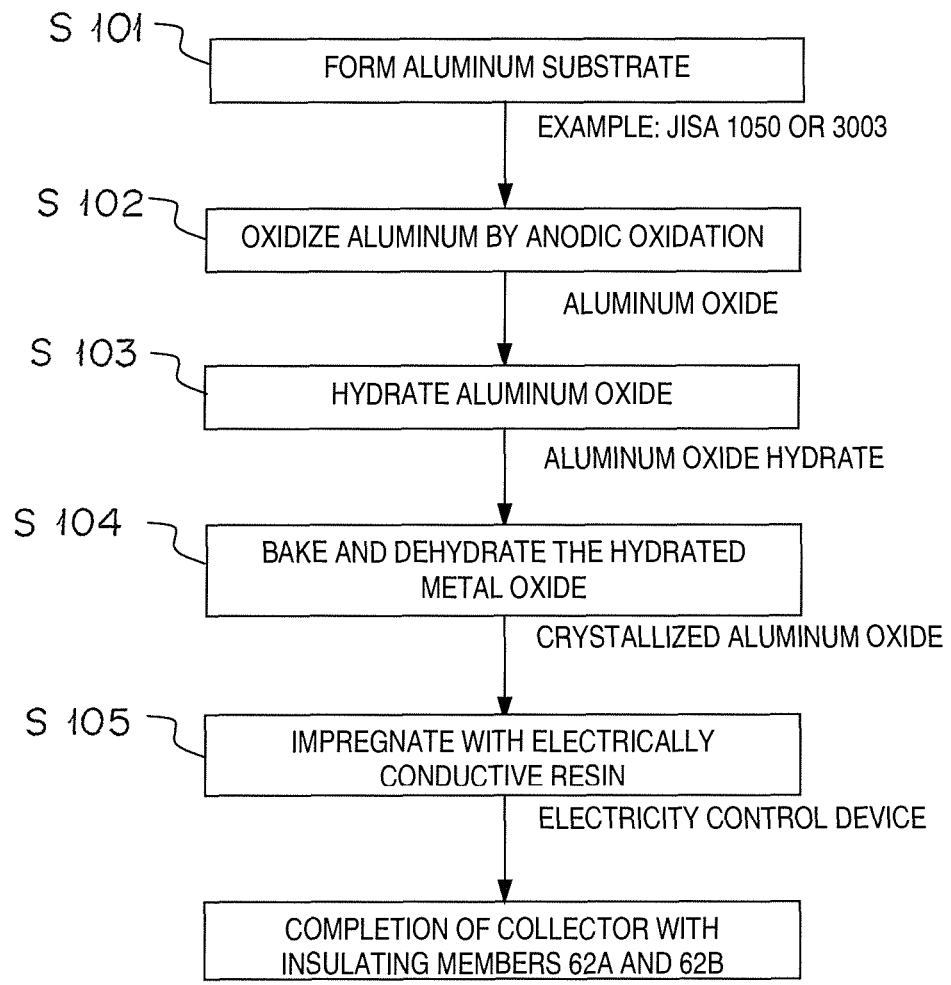
FIG. 4 is a flow chart that illustrates one example of a procedure for fabricating a collector equipped with an insulating member for the bipolar secondary battery in accordance with the first embodiment.

In this embodiment, a porous insulating material is made by using an anodic oxidizing method to form a metal oxide of an aluminum material. As shown in FIG. 4, an aluminum sheet material to be used as the substrate. The aluminum sheet material of the substrate is fabricated out of JISA1050 (step S101).

The aluminum sheet material is then immersed in an electrolyte solution that contains 4 wt % of oxalic acid. An electric power source is connected such that the aluminum sheet material, which serves as an anode, and a piece of stainless steel (SUS304) is also immersed in the electrolytic liquid, which serves as a cathode. A galvanostat is used as a current regulating device such that anodic oxidation can be conducted with a constant direct current having a current density of 50 A/m2, thereby oxidizing the aluminum sheet material into aluminum oxide (step S102).

The aluminum oxide obtained in step S102 is then immersed in water at 80° C. and hydrated to obtain aluminum oxide hydrate. The density of the porous material is controlled by using a water tank equipped with a heater and adjusting the amount of time at which the aluminum oxide is in contact with the 80° C. water in the water tank. The time of contact with the water is lengthened in order to increase the density of the insulating material and shortened in order to decrease the density of the insulating material (step S103).

The aluminum oxide hydrate obtained in step S103 is then put into an electric oven and baked for one hour at 500° C. in an atmosphere of air. The baking treatment serves to dehydrate the aluminum oxide hydrate and turn it into a crystallized aluminum oxide (step S104).

Then in step 105, an extruded sheet of composite resin made of acetylene black and polyethylene is mated with the crystalline aluminum oxide (a porous insulator) that was obtained in step S104. The extruded sheet of composite resin (i.e., electrically conductive composite resin material) and the crystalline aluminum oxide are hot pressed at 170° C. As a result, the crystalline aluminum oxide is impregnated with the electrically conductive composite resin material to form an electricity control device (step S105). Thus, a collector having the insulating members 62A and 62B is obtained.

With the anodic oxidation method used in this embodiment, an insulating metal oxide having any desired density can be formed by controlling the amount of time the metal oxide is in contact with the electrolyte solution and controlling the current density. Also, with the acetylene black and polyethylene composite used as the conductive composite resin material in this embodiment, the electrical conductivity of the material can be controlled by controlling the mixing proportion of the acetylene black and the polyethylene.

Although aluminum is used as the metal material of the insulating metal oxide in this embodiment, it is acceptable to use another metal that can be oxidized using an anodic oxidization method. Although oxalic acid is used as the electrolyte solution, it is also acceptable to use phosphoric acid, sulfuric acid, or another electrolyte solution typically used for anodic oxidization.

It is also possible to use a resin, ceramic, or other insulating material that has been formed on a mesh by extrusion, press forming, or cutting and impregnate the insulating material with a conductive material as described above.

The operation of the electric power generating unit 40 will now be explained. When an internal short circuit occurs inside the electric power generating unit 40 made according to this embodiment as described above, a localized current is prevented from continuing and localized heating is prevented. The mechanism by which a localized current is prevented from continuing will now be explained. In this embodiment, it is assumed that the positive electrode terminal plate 101 or the negative electrode terminal plate 102 is connected at a current lead connection position 51, and that the outermost collector 22a or the outermost collector 22b is connected to the region B at a current lead connection position 61.

For example, if an internal short circuit occurs in a single cell positioned in the region A shown in FIGS. 3A and 3B, then electric potential in the region A will be different from the electric potential in the regions B and C and a potential difference will exist between the region A and the region B. The potential difference will be such that the electric potential of the region B is higher and the electric potential of the region A is lower. Simultaneously with the occurrence of the potential difference, a localized current will flow in a portion where the internal short circuit occurred and heating will occur, causing a localized increase in temperature.

In places where the positive electrode terminal plate 101 or negative electrode terminal plate 102 contacts the outermost collector 22a or the outermost collector 22b, if the rectifying element 52A is provided between the region A and the region B of the positive electrode terminal plate 101 or the negative electrode terminal plate 102, then the rectifying element 52A will act to impede a current flowing from the region B to the region A. As a result, a situation in which a localized current continues to flow is avoided and localized heating is suppressed.

Meanwhile, if the fuse 52A is provided between the region A and the region B, then a localized temperature increase will cause the fuse 52A to melt and break, thus severing the electrical connection between the region A and the region B. In short, the fuse 52A will act to completely interrupt (stop) a current flowing from the region B to the region A. As a result, a situation in which a localized current continues to flow is avoided and localized heating is suppressed.

When a rectifying element (or a commutating element) is used as a current limiting device, the polarities of the rectifying elements are normally set such that current flows from the region B to the region A and current flows from the region C to the region B in the positive electrode terminal plate 101 because the current lead connection position 51 (61) is provided in the region B. In this way, the rectifying elements can be set such that current only flows in a current output direction. Thus, when a current starts to flow in an abnormal direction (i.e., a direction opposed to the output direction), as occurs during an internal short circuit, that current be prevented.

Although a diode or other rectifying element is used as the current limiting device in this embodiment, it is also acceptable to use a PTC element contrived such that an electrical resistance thereof increases sharply when a temperature thereof increases.

The electric power generating unit 40 of the first embodiment is provided with the rectifying elements or fuses 52A and 52B that are arranged to partition the positive electrode terminal plate 101 or the negative electrode terminal plate 102 into regions along the planar direction. As a result, when an internal short circuit occurs in the electric power generating unit 40, a current flowing in a planar direction between regions of the collector 22 can be limited or interrupted. Also, the insulating members 62A and 62B are provided in the collectors 22 so as to partition the collectors 22 into regions along the planar direction. Consequently, the electric power generating unit 40 can be made equivalent to a battery comprising bipolar secondary batteries that are divided into three regions A, B, and C and connected in parallel. Thus, within a collector 22 of a single cell 26, a current flowing in a planar direction of the collector 22 between regions can be interrupted. Additionally, the rectifying elements or fuses 52A and 52B and the insulating members 62A and 62B are arranged in identical positions (aligned) when the electric power generating unit 40 is viewed along the stacking direction. As a result, when an internal short circuit occurs in the electric power generating unit 40, an occurrence of a localized current can be prevented in a very effective manner.

In short, with the first embodiment, localized current can be impeded and heating can be held to a minimum when an internal short circuit occurs in one of the three regions into which the electric power generating unit 40 is partitioned because the region in which the internal short circuit occurred is isolated from the regions that are operating normally. Thus, the battery can continue to be used by utilizing only those regions that are operating normally.

Also, the first embodiment presents an example in which the rectifying elements or fuses 52A and 52B are provided in the positive and negative electrode terminal plates 101 and 102, and the insulating members 62A and 62B are provided in the collectors 22 forming the single cells 26 in order to prevent heating caused by an internal short circuit. However, with the arrangement, it is possible to prevent heating caused by an internal short circuit to some degree by providing the rectifying elements or fuses 52A and 52B in only the positive electrode terminal plate 101 or the negative electrode terminal plate 102.

Figure 5A:
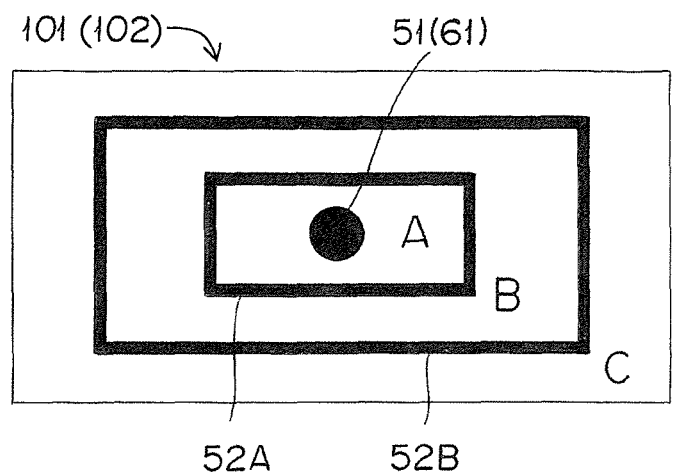
FIG. 5A is a schematic illustration of another arrangement of rectifying elements or fuses that are provided on the positive and negative electrode terminal plates shown in FIG. 2 as viewed along the stacking direction in accordance a variation of the first embodiment.
Figure 5B:
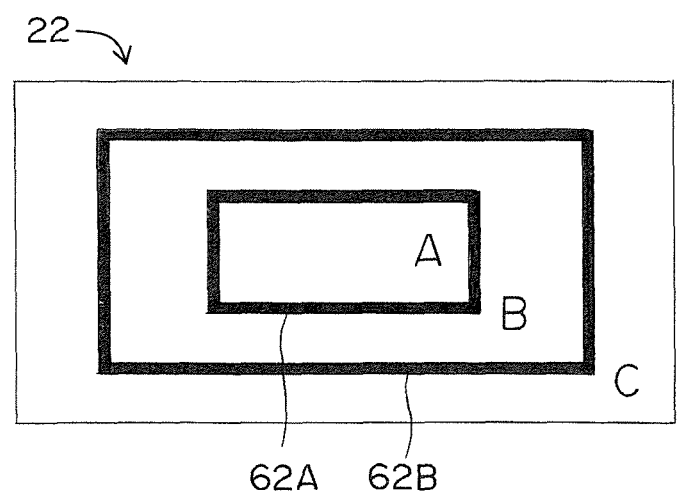
FIG. 5B is a schematic illustration of another arrangement of insulating members that are provided in the electric power generating unit shown in FIG. 2 as viewed along the stacking direction in accordance the variation of the first embodiment.

Now a first variation of the first embodiment will now be discussed. FIG. 5A shows a different arrangement of rectifying elements or fuses 52A and 52B provided on the positive electrode terminal plate 101 and the negative electrode terminal plate 102 shown in FIG. 2 as viewed along the stacking direction. The arrangement is different from the first embodiment. FIG. 5B shows a different arrangement of the insulating members 62A and 62B provided on the collector 22 of the single cell 26 shown in FIG. 2 as viewed along the stacking direction. The arrangement is different from the first embodiment. The basic structure of the electric power generating unit 40 and the constituent features of the component elements of the electric power generating unit 40 are the same as in the first embodiment and explanations thereof are omitted here.

The only difference with respect to the first embodiment is that the arrangement of the rectifying elements or fuses 52A and 52B provided in the positive electrode terminal plate 101 and the negative electrode terminal plate 102 and the arrangement of the insulating members 62A and 62B provided in the electric power generating unit 40 are different in the first variation.

In the first variation, as shown in FIG. 5A, the rectifying elements or fuses 52A and 52B of the positive electrode terminal plate 101 and the negative electrode terminal plate 102 are configured to have the shapes of differently sized rectangles that are arranged concentrically and proportioned similarly to the positive electrode terminal plate 101 and the negative electrode terminal plate 102. The rectifying elements or fuses 52A and 52B are arranged to partition each of the rectangular terminal plates into three regions A, B, and C.

The three regions A, B, and C are electrically connected (linear connection) to one another at the borders therebetween by the rectifying elements or fuses 52A and 52B. Since the rectifying elements or fuses 52A and 52B operate in the same fashion as in the first embodiment, explanations thereof are omitted here. In this embodiment, the rectifying elements or fuses 52A and 52B are provided on both the positive electrode terminal plate 101 and the negative electrode terminal plate 102. However, it is also acceptable to provide rectifying elements or fuses 52A and 52B on only the positive electrode terminal plate 101 or only the negative electrode terminal plate 102.

As shown in FIG. 5B, each of the single cells 26 making up the electric power generating unit 40 has the insulating members 62A and 62B arranged in positions corresponding to (aligned with) the rectifying elements or fuses 52A and 52B of the positive electrode terminal plate 101 and the negative electrode terminal plate 102 along the stacking direction. Therefore, the shapes of the insulating members 62A and 62B are rectangular like the rectifying elements or fuses 52A and 52B.

The insulating members 62A and 62B are contrived to interrupt a current flowing in the collector 22 between partitioned regions. Thus, due to the action of the insulating members 62A and 62B, the single cells 26 arranged between the positive electrode terminal plate 101 and the negative electrode terminal plate 102 are equivalent to six single cells 26 that each comprise three regions A, B, and C and are connected together in parallel.

The rectifying elements or fuses 52A and 52B and the insulating members 62A and 62B are arranged in identical positions when the electric power generating unit 40 is viewed along a stacking direction such that a region in which an internal short circuit occurs can be isolated from other regions that are functioning properly. As a result, a situation in which a localized current continues to flow can be avoided and localized heating can be suppressed.

In the first variation, similarly to the first embodiment, it is preferable for the surface areas of the three regions A, B, and C to be equal when the probability that an internal short circuit will occur is not related to the shape or arrangement of the bipolar secondary battery 100. For example, if the probability that an internal short circuit will occur becomes higher as one moves from an outer periphery of the bipolar secondary battery 100 toward the center of the same, then it is preferable for the surfaces areas of the regions to decrease as one moves from region A to region C (A>B>C). Conversely, if the probability that an internal short circuit will occur becomes higher as one moves from a center of the bipolar secondary battery 100 toward an outer periphery of the same, then it is preferable for the surfaces areas of the regions to increase as one moves from region A to region C (A<B<C).

Although, like the first embodiment, the first variation illustrates a case in which insulating members 62A and 62B are provided in all of the collectors 22 making up the electric power generating unit 40, it is acceptable not to provide the insulating members 62A and 62B in all of the collectors 22. For example, it is acceptable to provide insulating members 62A and 62B in every other of the collectors 22 along the stacking direction.

Figure 6A:
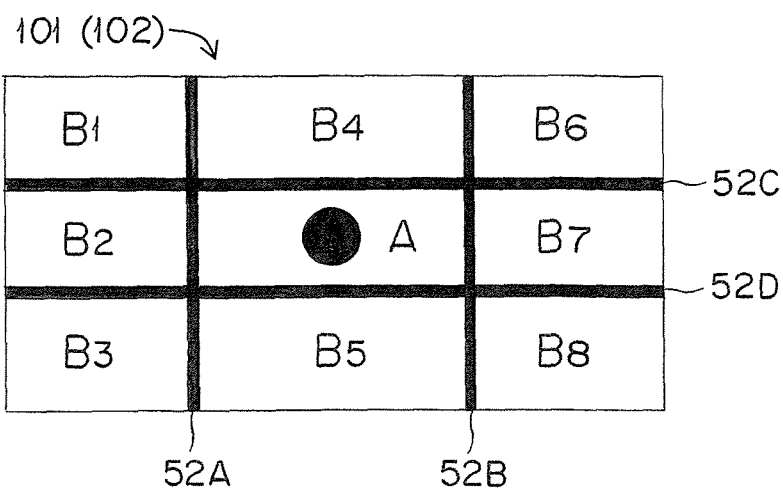
FIG. 6A is a schematic illustration of another arrangement of rectifying elements or fuses that are provided on the positive and negative electrode terminal plates shown in FIG. 2 as viewed along the stacking direction in accordance the variation of the first embodiment.
Figure 6B:
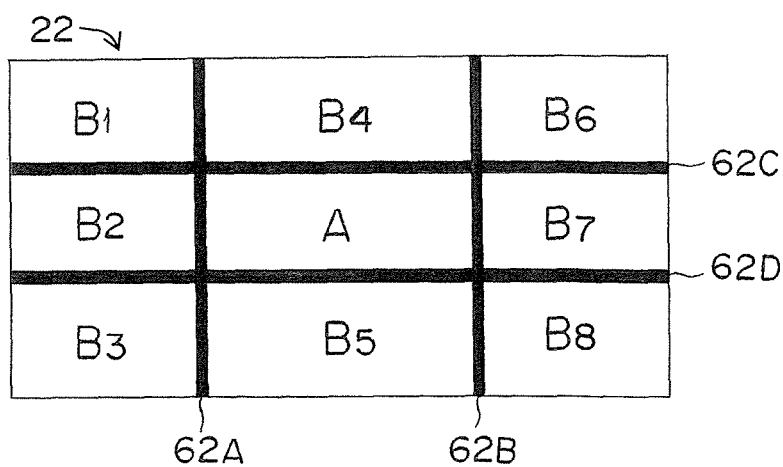
FIG. 6B is a schematic illustration of another arrangement of insulating members that are provided in the electric power generating unit shown in FIG. 2 as viewed along the stacking direction in accordance with the variation of the first embodiment.

Now a second variation of the first embodiment will now be discussed. FIG. 6A shows a different arrangement of rectifying elements or fuses 52A and 52B provided on the positive electrode terminal plate 101 and the negative electrode terminal plate 102 shown in FIG. 2 as viewed along the stacking direction. The arrangement is different from the first embodiment. FIG. 6B shows an arrangement of the insulating members 62A and 62B provided in the electric power generating unit 40 shown in FIG. 2 as viewed along the stacking direction. The arrangement is different from the first embodiment. The basic structure of the electric power generating unit 40 and the constituent features of the component elements of the electric power generating unit 40 are the same as in the first embodiment and explanations thereof are omitted here. The only difference with respect to the first embodiment and the first variation is that the arrangement of the rectifying elements or fuses 52A and 52B provided in the positive electrode terminal plate 101 and the negative electrode terminal plate 102 and the arrangement of the insulating members 62A and 62B provided in the electric power generating unit 40 are different in the second variation.

In the second variation, as shown in FIG. 6A, the rectifying elements or fuses 52A, 52B, 52C, and 52D are provided on the positive electrode terminal plate 101 and the negative electrode terminal plate 102 in a crisscross arrangement such that each of the positive electrode terminal plate 101 and the negative electrode terminal plate 102 is partitioned into nine regions A, B1, B2, B3, B4, B5, B6, B7, and B8. The nine regions A and B1 to B8 are electrically connected (linear connection) to one another at the borders there-between by the rectifying elements or fuses 52A, 52B, 52C, and 52D. Since the rectifying elements or fuses 52A, 52B, 52C, and 52D operate in the same fashion as in the first embodiment, explanations thereof are omitted here. In the second variation, too, the rectifying elements or fuses 52A, 52B, 52C, and 52D are provided on both the positive electrode terminal plate 101 and the negative electrode terminal plate 102. However, it is also acceptable to provide rectifying elements or fuses on only the positive electrode terminal plate 101 or only the negative electrode terminal plate 102.

As shown in FIG. 6B, each of the bipolar electrodes 21 of the electric power generating unit 40 has insulating members 62A, 62B, 62C, and 62D arranged in positions corresponding to the rectifying elements or fuses 52A, 52B, 52C, and 52D of the positive electrode terminal plate 101 and the negative electrode terminal plate 102 along a stacking direction.

The insulating members 62A, 62B, 62C, and 62D are contrived to interrupt a current flowing in a collector 22 between partitioned regions. Thus, due to the action of the insulating members 62A, 62B, 62C, and 62D, the single cells 26 arranged between the positive electrode terminal plate 101 and the negative electrode terminal plate 102 are equivalent to nine single cells 26 that each comprise nine regions A and B1 to B8 and are connected together in parallel.

The rectifying elements or fuses 52A, 52B, 52C, and 52D and the insulating members 62A, 62B, 62C, and 62D are arranged in identical positions (aligned) when the electric power generating unit 40 is viewed along the stacking direction such that a region in which an internal short circuit occurs can be isolated from other regions that are functioning properly. As a result, a situation in which a localized current continues to flow can be avoided and localized heating can be suppressed.

In the second variation, similarly to the first embodiment, it is preferable for the surface areas of the regions A and B1 to B8 to be equal when the probability that an internal short circuit will occur is not related to the shape or arrangement of the bipolar secondary battery 100. For example, if the probability that an internal short circuit will occur becomes higher as one moves from an outer periphery of the bipolar secondary battery 100 toward the center of the same, then it is preferable for the surfaces areas of the regions to decrease as one moves from region A to an outer region B1 to B8 (A>B1 to B8). For example, if the probability that an internal short circuit will occur becomes higher as one moves from the center of the bipolar secondary battery 100 toward an outer periphery of the same, then it is preferable for the surfaces areas of the regions to increase as one moves from region A to an outer region B1 to B8 (A<B1 to B8).

Although, like the first embodiment, the second variation illustrates a case in which the insulating members 62A, 62B, 62C, and 62D are provided in all of the collectors 22 making up the electric power generating unit 40, it is acceptable not to provide insulating members 62A, 62B, 62C, and 62D in all of the collectors 22. For example, it is acceptable to provide the insulating members 62A, 62B, 62C, and 62D in every other of the collectors 22 along the stacking direction.

The effects obtained with the first and second variations of the first embodiment are the same as the effects obtained with the first embodiment.

A battery back having a high capacity and a high output can be obtained with a plurality of bipolar secondary batteries 100 configured according to the embodiment or variations thereof described above by electrically connecting the bipolar secondary batteries 100 together in series and/or parallel.

Figure 11A:
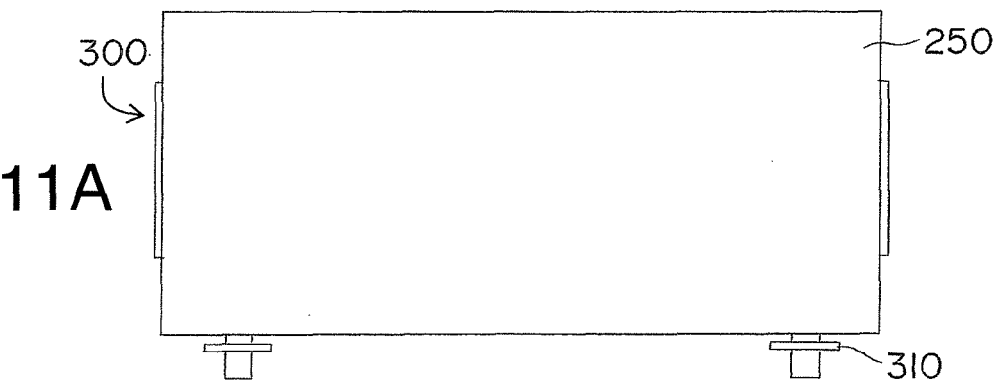
FIG. 11A is a top plan view of a battery pack comprising a plurality of the bipolar secondary batteries connected together.
Figure 11B:
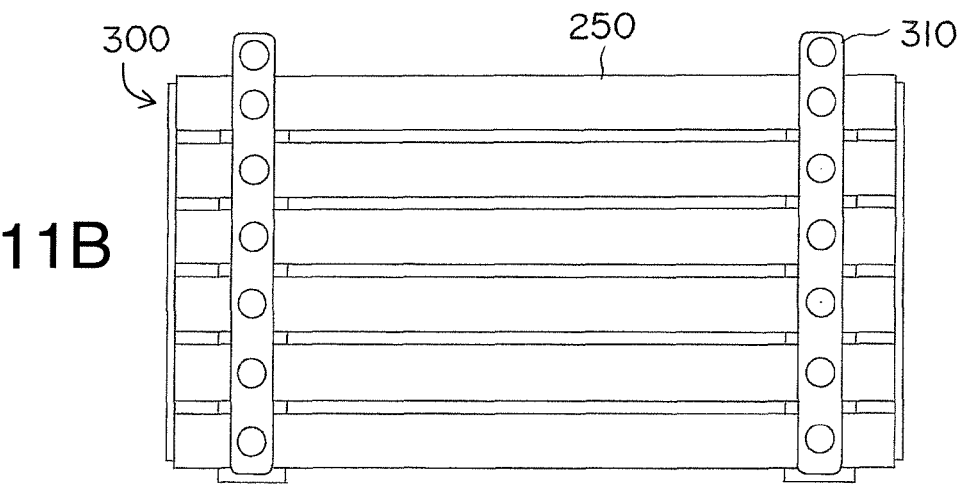
FIG. 11B is a front elevational view of the battery pack that is illustrated in FIG. 11A.
Figure 11C:
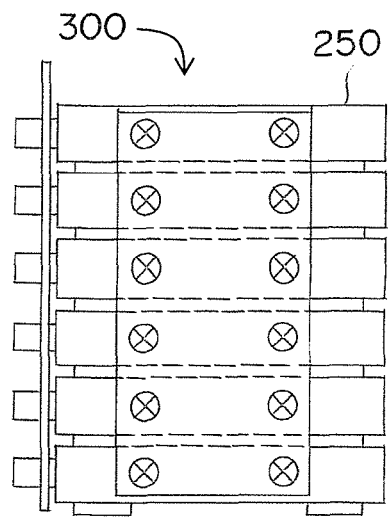
FIG. 11C is a right side elevational view of the battery pack that is illustrated in FIGS. 11A and 11B.

FIGS. 11A to 11C illustrate an example of a battery pack. To make this battery pack, first a battery pack module 250 (see FIG. 11) is made by connecting a plurality of bipolar secondary batteries 100 in series and/or parallel. Several of such battery pack modules 250 are then connected together in series and/or parallel to form a battery pack 300. Although each of the battery pack modules 250 constitutes one battery pack, the term "battery pack module" is used in this explanation to distinguish from the battery pack 300.

Each of the battery pack modules 250 includes a plurality of bipolar secondary batteries 100 stacked on one another and enclosed inside a module case. The bipolar secondary batteries 100 are connected in parallel. A positive side bus bar and a negative side bus bar are connected to each of the bipolar secondary batteries 100 with a conductive bar inside a connection hole. FIG. 11A shows a top plan view of the battery pack 300. FIG. 11B shows a front elevational view of the battery pack 300. FIG. 11C shows a side elevational view of the battery pack 300. The battery pack modules 250 are electrically connected together with a bus bar or the like and stacked on one another using connecting jigs 310. The number of bipolar secondary batteries 100 connected together to make each of the battery pack modules 250 and the number of battery pack modules 250 stacked on one another to make the battery pack 300 is determined based on the battery capacity and output required for the vehicle (electric car) in which the battery pack will be installed.

Since the battery pack 300 is constructed by connecting bipolar secondary batteries 100 together in series, in parallel, or a combination of series and parallel, the capacity and output of the battery pack 300 can be adjusted freely. Also, the electric power generating units 40 used in the bipolar secondary batteries 100 are contrived such that current flows in a stacking direction inside the electric power generating unit 40 and each of the bipolar secondary batteries 100 is structured to take advantage of this feature of electric power generating unit 40. Since the bipolar secondary batteries 100 making up each of the battery pack modules 250 are contrived to limit or interrupt a current flowing in a planar direction of a collector when an internal short circuit occurs inside a bipolar secondary battery 100, the bipolar secondary batteries have a long service life and are highly reliable. Consequently, the battery pack 300 also has a long service life and is highly reliable. Furthermore, even if a portion of the battery pack modules 250 fail, the battery pack 300 can be repaired by replacing only the failed battery pack modules 250.

Figure 12:
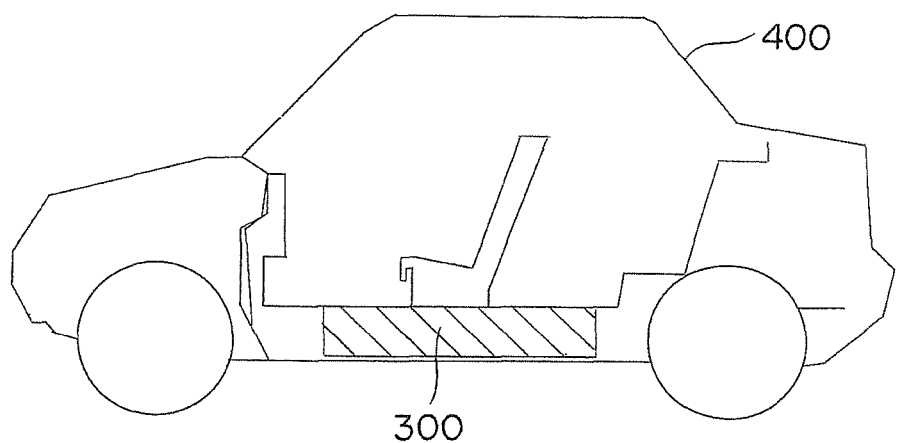
FIG. 12 is a vehicle equipped with a plurality of the bipolar secondary batteries that forms the battery pack that is illustrated in FIGS. 11A to 11C.

Referring to FIG. 12, the bipolar secondary battery 100, the battery pack module 250, or the battery pack 300 like those described heretofore can be installed in a vehicle 400 and used as a power source.

FIG. 12 shows the vehicle 400 in which the battery pack 300 described above is installed. The battery pack 300 is a vehicle power source for driving at least one of the wheels of the vehicle 400. In other words, the battery pack 300 constitutes a vehicle wheel drive source. As shown in FIG. 12, the battery pack 300 is installed in the vehicle 400 so as to be arranged below a seat in a middle portion of the vehicle body of the vehicle 400. The battery pack 300 is arranged below the seat so that the vehicle can be provided with a larger cabin space and a larger trunk. However, the installation is not limited to installing the battery pack 300 below the seat. It is also acceptable to install the battery pack 300 below the trunk room at the rear of the vehicle or in the engine room at the front of the vehicle.

The vehicle 400 is equipped with the bipolar secondary batteries 100 that limit or interrupt a current flowing in a planar direction of a collector when an internal short circuit occurs in the bipolar secondary battery, or the vehicle 400 is equipped with a battery pack comprising a plurality of such bipolar secondary batteries. As a result, the safety and reliability of the vehicle 400 can be increased.

The installation is not limited to installing the battery pack 300 in the vehicle 400. Depending on the application, it is acceptable to install the battery pack module 250 shown in FIG. 11 or only the bipolar secondary battery 100 shown in FIG. 1. It is also acceptable to install a combination of a battery pack 300, a battery pack module(s) 250, and the bipolar secondary battery(ies) 100. Although hybrid cars, electric cars, and fuel-cell cars are preferred vehicles in which the battery pack 300 or the battery pack module 250 can be used, the battery pack 300 and the battery pack module 250 are not limited to such vehicles. The bipolar secondary battery 100 and/or the battery pack 300 according to this embodiment can also be used as an uninterruptible power supply unit or other onboard power source.

Second Embodiment

In the first embodiment, each of the rectifying elements or fuses 52A and 52B linearly partitioning the positive electrode terminal plate 101 and the negative electrode terminal plate 102 are configured span across the entire border between partitioned regions. In the second embodiment, the rectifying elements or fuses 52A and 52B are provided in portions of the regions into which each of the terminal plates are partitioned and the remainder of the border portions are insulated with insulating members.

Figure 7A:
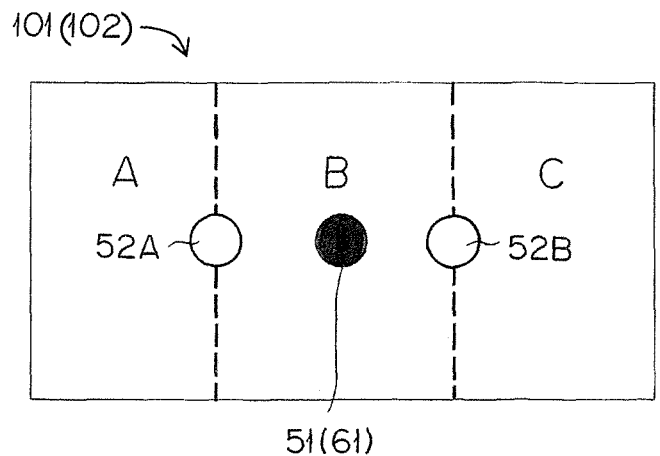
FIG. 7A is a schematic illustration of another of rectifying elements or fuses that are provided on the positive and negative electrode terminal plates shown in FIG. 2 as viewed along the stacking direction, with the rectifying elements or fuses being provided in portions of three regions into which each of the terminal plates has been partitioned.
Figure 7B:
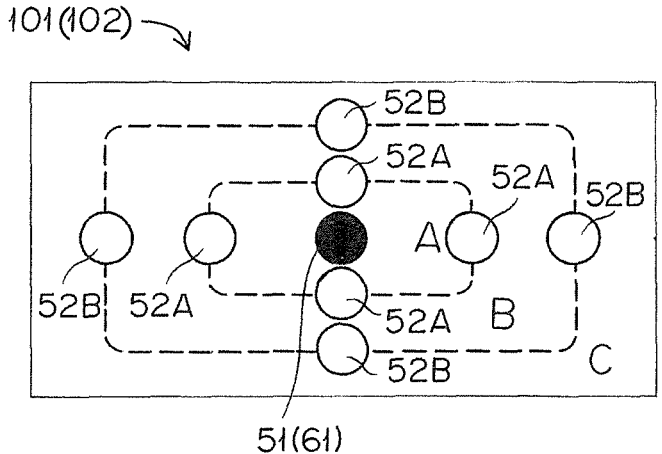
FIG. 7B is a schematic illustration of another arrangement in which the rectifying elements or fuses are provided in portions of three rectangular regions into which each of the terminal plates has been partitioned.
Figure 7C:
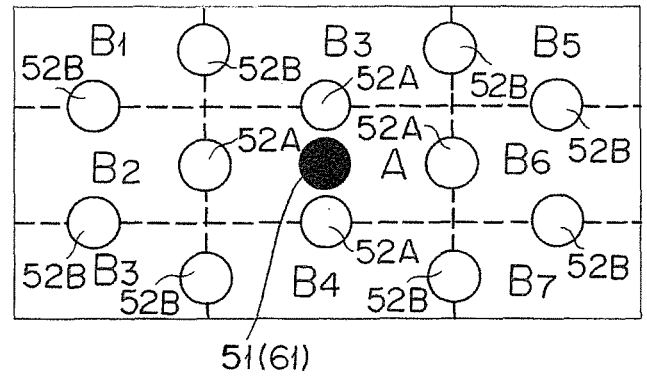
FIG. 7C is a schematic illustration of another arrangement in which the rectifying elements or fuses are provided in portions of nine cell-like regions into which each of the terminal plates has been partitioned.

FIG. 7A shows an arrangement of rectifying elements or fuses 52A and 52B provided on the positive electrode terminal plate 101 and the negative electrode terminal plate 102 shown in FIG. 2 as viewed along the stacking direction, with the rectifying elements or fuses 52A and 52B being provided in portions of three regions into which each of the terminal plates 101 and 102 are partitioned. FIG. 7B shows an arrangement in which the rectifying elements or fuses 52A and 52B are provided in portions of the three rectangular regions into which each of the terminal plates 101 and 102 are partitioned. FIG. 7C shows an arrangement in which the rectifying elements or fuses 52A and 52B are provided in portions of nine cell-like regions into which each of the terminal plates 101 and 102 are partitioned. The basic structure of the electric power generating unit 40 and the constituent features of the component elements of the electric power generating unit 40 are the same as in the first embodiment and explanations thereof are omitted here.

Regarding this second embodiment and its variations, the insulating members 62A and 62B provided on the bipolar electrodes 21 are not explained because they are exactly the same as in the first embodiment, the first variation of the first embodiment, and the second variation of the first embodiment in that the insulating members 62A and 62B are identical in shape and positions as the rectifying elements or fuses 52A and 52B. Thus, the shape and positions of the insulating members 62A and 62B provided on the bipolar electrodes 21 are adjusted to match the shapes and positions of the rectifying elements or fuses 52A and 52B provided on the positive electrode terminal plate 101 and the negative electrode terminal plate 102.

In this embodiment, the current lead connection positions, i.e., the positions where the positive electrode terminal plate 101 is connected to the outermost collector 22a and the negative electrode terminal plate 102 is connected to the outermost collector 22b, are provided in a middle portion of the electric power generating unit 40.

In the example shown in FIG. 7A, the rectifying elements or fuses 52A and 52B are arranged on the positive electrode terminal plate 101 and the negative electrode terminal plate 102 along portions of the borders between the three regions A, B, and C into which each of the terminal plates is partitioned. Insulation parts are provided along portions of the borders (indicated with a dotted line in the figure) where the rectifying elements or fuses 52A and 52B are not provided. Thus, the three regions A, B, and C are electrically connected (point connection) to one another at the borders there-between through the rectifying elements or fuses 52A and 52B. A current flowing from the region A to the region B passes through the rectifying element or fuse 52A, which is provided at a single point along a borderline between the region A and the region B. A current flowing from the region C to the region B passes through the rectifying element or fuse 52B, which is provided at a single point along a borderline between the region C and the region B.

When an internal short circuit occurs in the electric power generating unit 40, the rectifying elements or fuses 52A and 52B serve to limit the size of a current flowing in the collector 22 between different regions or to interrupt (stop) a current flowing in the collector 22 between different regions. For example, when an internal short circuit occurs in the region A and current flows in the collector from the region B toward the region A, the rectifying element or fuse 52A acts to either limit the size of or interrupt the current.

In the example shown in FIG. 7B, the four rectifying elements or fuses 52A and four rectifying elements or fuses 52B are arranged on the positive electrode terminal plate 101 and the negative electrode terminal plate 102 in portions of the three regions A, B, and C into which each of the terminal plates is partitioned. Insulation parts are provided along portions of the borders (indicated with a dotted line in the figure) where the rectifying elements or fuses 52A and 52B are not provided. Thus, the three regions A, B, and C are electrically connected (point connection) to one another at the borders there-between through the four rectifying elements or fuses 52A and the four rectifying elements or fuses 52B. A current flowing from the region B to the region A passes through the rectifying elements or fuses 52A provided at four points along a borderline between the region A and the region B. Meanwhile, a current flowing from the region C to the region B passes through the rectifying element or fuse 52B, which is provided at a single point along a borderline between the region C and the region B.

When an internal short circuit occurs in the electric power generating unit 40, the rectifying elements or fuses 52A and 52B serve to limit the size of a current flowing in the collector between different regions or to interrupt a current flowing in the collector 22 between different regions. For example, when an internal short circuit occurs in the region B and current flows in the collector 22 from the regions A and C toward the region B, the four rectifying elements or fuses 52A act to either limit the size of or interrupt the current.

In the example shown in FIG. 7C, a total of twelve rectifying elements or fuses 52A and 52B are arranged on the positive electrode terminal plate 101 and the negative electrode terminal plate 102 at portions of the borders between the nine regions into which each of the terminal plates is partitioned. One rectifying element or fuse 52A, 52B is arranged on each border. Insulation parts are provided along portions of the borders (indicated with a dotted line in the figure) where the rectifying elements or fuses 52A and 52B are not provided. Thus, the nine regions A and B1 to B8 are electrically connected (point connection) to one another at the borders there-between through the rectifying elements or fuses 52A and 52B, one of which is provided on each of the borders. A current flowing from any of the regions B1 through B8 to the region A passes through one of the rectifying elements or fuses 52A and 52B provided at twelve points along borderlines between the region A and each of the regions B1 to B8.

When an internal short circuit occurs in the electric power generating unit 40, the rectifying elements or fuses 52A and 52B serve to limit the size of a current flowing in the collector between different regions or to interrupt a current flowing in the collector 22 between different regions. For example, when an internal short circuit occurs in the region B1 and current flows toward the region B1 in the collector 22 from a region other than the region B1, two of the rectifying elements or fuses 52B act to either limit the size of or interrupt the current.

In this embodiment, the rectifying elements or fuses 52A and 52B are provided on both the positive electrode terminal plate 101 and the negative electrode terminal plate 102. However, it is also acceptable to provide rectifying elements or fuses on only the positive electrode terminal plate 101 or only the negative electrode terminal plate 102.

Variation of Second Embodiment

Although the second embodiment presents an example in which the current lead connection positions 51 and 61 are provided in a middle portion of the electric power generating unit 40, in this variation the current lead connection positions 51 and 61 are provided on an edge portion of the electric power generating unit 40.

Figure 8A:
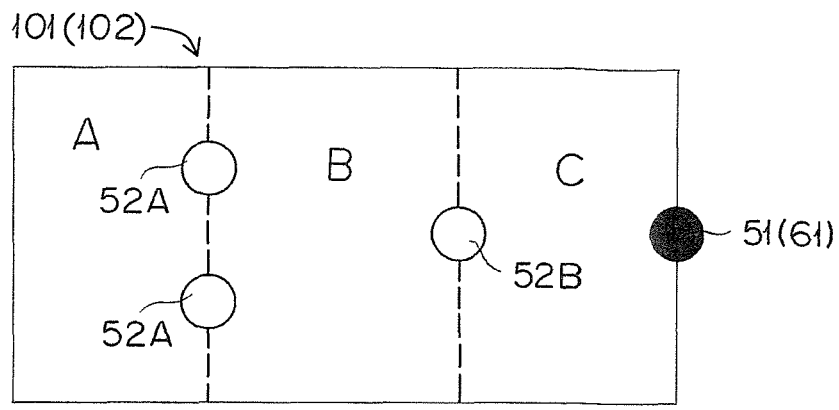
FIG. 8A is a schematic illustration of another arrangement of rectifying elements or fuses that are provided on the positive and negative electrode terminal plates shown in FIG. 2 as viewed along the stacking direction, with the rectifying elements or fuses being provided in portions of three regions into which each of the terminal plates has been partitioned.
Figure 8B:
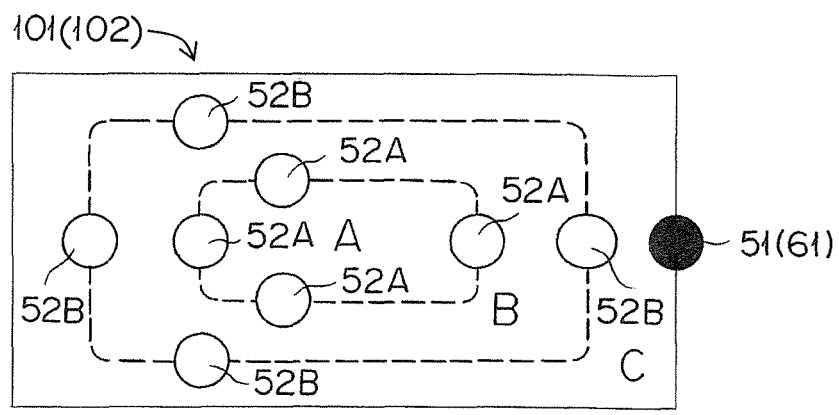
FIG. 8B is a schematic illustration of another arrangement in which the rectifying elements or fuses are provided in portions of three rectangular regions into which each of the terminal plates has been partitioned.
Figure 8C:
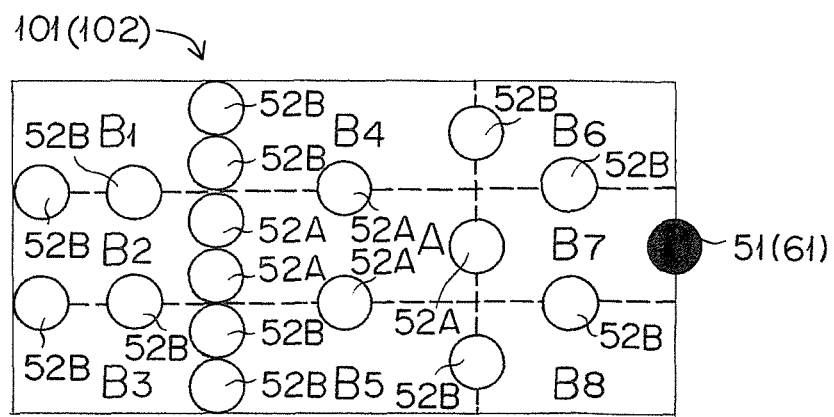
FIG. 8C is a schematic illustration of another arrangement in which the rectifying elements or fuses are provided in portions of nine cell-like regions into which each of the terminal plates has been partitioned.

FIG. 8A shows an arrangement of the rectifying elements or fuses 52A and 52B and a current lead connecting position provided in the electric power generating unit 40 shown in FIG. 2 as viewed along the stacking direction, with the rectifying elements or fuses 52A and 52B being provided in portions of three regions into which each of the terminal plates 101 and 102 has been partitioned. FIG. 8B shows an arrangement in which the rectifying elements or fuses 52A and 52B are provided in portions of the three rectangular regions into which each of the terminal plates 101 and 102 are partitioned. FIG. 8C shows an arrangement in which the rectifying elements or fuses 52A and 52B are provided in portions of nine cell-like regions into which each of the terminal plates 101 and 102 are partitioned. The basic structure of the electric power generating unit 40 and the constituent features of the component elements of the electric power generating unit 40 are the same as in the first embodiment and explanations thereof are omitted here.

Regarding this variation of the second embodiment, the insulating members 62A and 62B provided on the bipolar electrodes 21 are not explained because they are exactly the same as in the first embodiment, the first variation of the first embodiment, and the second variation of the first embodiment in that the insulating members 62A and 62B are identical in shape and positions as the rectifying elements or fuses 52A and 52B. Thus, the shape and positions of the insulating members 62A and 62B provided on the bipolar electrodes 21 are adjusted to match the shapes and positions of the rectifying elements or fuses provided on the positive electrode terminal plate 101 and the negative electrode terminal plate 102.

In this embodiment, the current lead connection positions are provided on edge portions of the electric power generating unit 40. In the example shown in FIG. 8A, the rectifying elements or fuses 52A and 52B are arranged on the positive electrode terminal plate 101 and the negative electrode terminal plate 102 in portions of the three regions A, B, and C into which each of the terminal plates is partitioned. Two rectifying elements or fuses 52A are provided at the border between the region A and the region B (which is farther from the current lead connection position 51), and one rectifying element or fuse 52B is provided at the border between the region B and the region C (which is closer to the current lead connection position 51). Insulation parts are provided along portions of the borders (indicated with a dotted line in the figure) where the rectifying elements or fuses 52A and 52B are not provided. Thus, the three regions A, B, and C are electrically connected (point connection) to one another at the borders there-between through the rectifying elements or fuses 52A and 52B. A current flowing from the region A to the region B passes through the rectifying elements or fuses 52A provided at two points along a borderline between the region A and the region B. A current flowing from the region B to the region C passes through the rectifying element or fuse 52B, which is provided at a single point along a borderline between the region B and the region C.

The number of rectifying elements or fuses provided on a border positioned farther from the current lead connection position 51 is larger than the number of rectifying elements or fuses provided on a border positioned closer to the current lead connection position 51 because the electrical resistance along a planar direction of the collector is larger at positions farther from the current lead connection position 51. Thus, more rectifying elements or fuses are provided on a border positioned farther from the current lead connection position 51 in order to enable electric current to flow more easily.

When an internal short circuit occurs in the electric power generating unit 40, the rectifying elements or fuses 52A and 52B serve to limit the size of a current flowing in a planar direction of the collector between different regions or to interrupt a current flowing in a planar direction of the collector between different regions. For example, when an internal short circuit occurs in the region A and current flows in the collector from the region B toward the region A, the rectifying element or fuse 52A acts to either limit the size of or interrupt the current.

In the example shown in FIG. 8B, the rectifying elements or fuses 52A and 52B are arranged on the positive electrode terminal plate 101 and the negative electrode terminal plate 102 in portions of three regions A, B, and C into which each of the terminal plates 101 and 102 forming these electrodes is partitioned. Larger numbers of rectifying elements or fuses are provided on borders positioned farther from the current lead connection position 51. Even along the same boarder between the region A and the region B, three rectifying elements or fuses 52A are provided in positions farther from the current lead connection position 51 and one rectifying element or fuse 52A is provided in a position close to the current lead connection position 51. Similarly, along boarder between the region B and the region C, three rectifying elements or fuses 52B are provided in positions farther from the current lead connection position 51 and one rectifying element or fuse 52B is provided in a position close to the current lead connection position 51. Insulation parts are provided along portions of the borders (indicated with a dotted line in the figure) where the rectifying elements or fuses 52A and 52B are not provided. Thus, the three regions A, B, and C are electrically connected (point connection) to one another at the borders there-between through the rectifying elements or fuses 52A and 52B. A current flowing from the region A to the region B passes through the rectifying elements or fuses 52A provided at four points along a borderline between the region A and the region B. Similarly, a current flowing from the region B to the region C passes through the rectifying elements or fuses 52B provided at four points along a borderline between the region B and the region C.

The number of rectifying elements or fuses provided on a border positioned farther from the current lead connection position 51 is larger than the number of rectifying elements or fuses provided on a border positioned closer to the current lead connection position 51 because the electrical resistance along a planar direction of the collector is larger at positions farther from the current lead connection position 51. Thus, more rectifying elements or fuses are provided on a border positioned farther from the current lead connection position 51 in order to enable electric current to flow more easily.

When an internal short circuit occurs in the electric power generating unit 40, the rectifying elements or fuses 52A and 52B serve to limit the size of a current flowing in the collector 22 between different regions or to interrupt a current flowing in the collector between different regions. For example, when an internal short circuit occurs in the region C and current flows in the collector 22 from the region B toward the region C, the rectifying elements or fuses 52A act to either limit the size of or interrupt the current.

In the example shown in FIG. 8C, the rectifying elements or fuses 52A and 52B are arranged on the positive electrode terminal plate 101 and the negative electrode terminal plate 102 at portions of borders between nine regions into which each of the terminal plates is partitioned. Larger numbers of rectifying elements or fuses are provided on borders positioned farther from the current lead connection position 51. In the example shown in FIG. 8C, a total of seventeen rectifying elements or fuses 52A and 52B are provided on each of the terminal plates. Insulation parts are provided along portions of the borders (indicated with a dotted line in the figure) where the rectifying elements or fuses 52A and 52B are not provided. Thus, the nine regions A and B1 to B8 are electrically connected (point connection) to one another at the borders there-between through the rectifying elements or fuses 52A and 52B. A current flowing to the region B7 where the current lead connection position 51 is located passes through one of the rectifying elements or fuses 52A and 52B provided at seventeen points along the borderlines between the region A and the regions B1 to B5, B6, and B8.

The number of rectifying elements or fuses provided on a border positioned farther from the current lead connection position 51 is larger than the number of rectifying elements or fuses 52A and 52B provided on a border positioned closer to the current lead connection position 51 because the electrical resistance along a planar direction of the collector 22 is larger at positions farther from the current lead connection position 51. Thus, more rectifying elements or fuses are provided on a border positioned farther from the current lead connection position 51 in order to enable electric current to flow more easily.

When an internal short circuit occurs in the electric power generating unit 40, the rectifying elements or fuses 52A and 52B serve to limit the size of a current flowing in the collector between different regions or to interrupt a current flowing in the collector 22 between different regions. For example, when an internal short circuit occurs in the region B1 and current flows in the collector 22 from another region toward the region B1, the rectifying elements or fuses 52A act to either limit the size of or interrupt the current.

In this variation, the rectifying elements or fuses 52A and 52B are provided on both the positive electrode terminal plate 101 and the negative electrode terminal plate 102. However, it is also acceptable to provide rectifying elements or fuses on only the positive electrode terminal plate 101 or only the negative electrode terminal plate 102.

Similarly to the first embodiment, a bipolar secondary battery according to the second embodiment or the variation of the second embodiment can be used to make a battery pack. Additionally, the bipolar secondary battery or battery pack can be installed in a vehicle. Furthermore, since such a battery pack or vehicle uses a bipolar secondary battery according to the second embodiment, heating caused by an internal short circuit can be suppressed or prevented and, thus, the battery can be prevented from causing heat damage.

Third Embodiment

In the first and second embodiments, the rectifying elements or fuses 52A and 52B are provided on border portions between regions into which the positive electrode terminal plate 101 and the negative electrode terminal plate 102 have been partitioned. A potential difference between regions or heat at a border portion is detected independently and a current in the positive electrode terminal plate 101 or the negative electrode terminal plate 102 is limited or interrupted.

Figure 9:
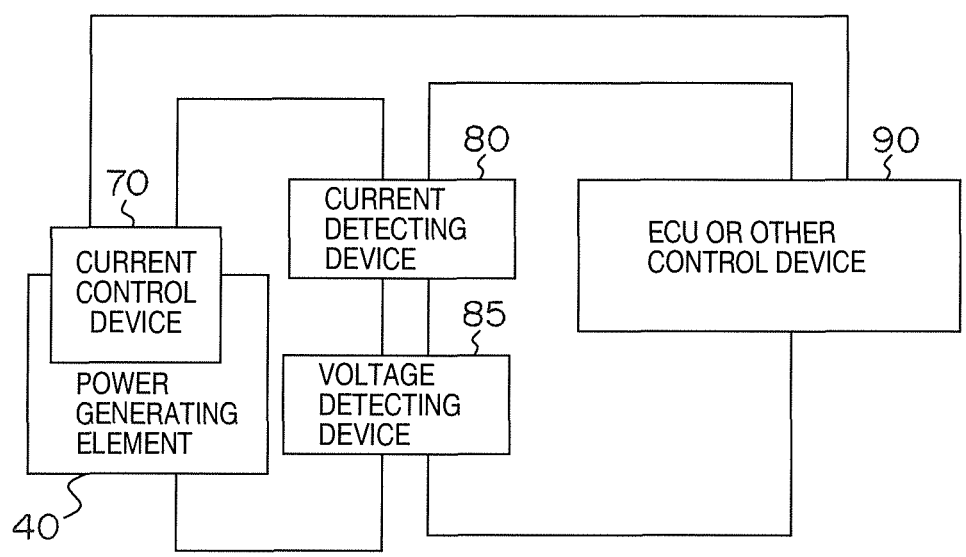
FIG. 9 is a block diagram of a control system for the electric power generating unit in accordance with a third embodiment.
Figure 10:
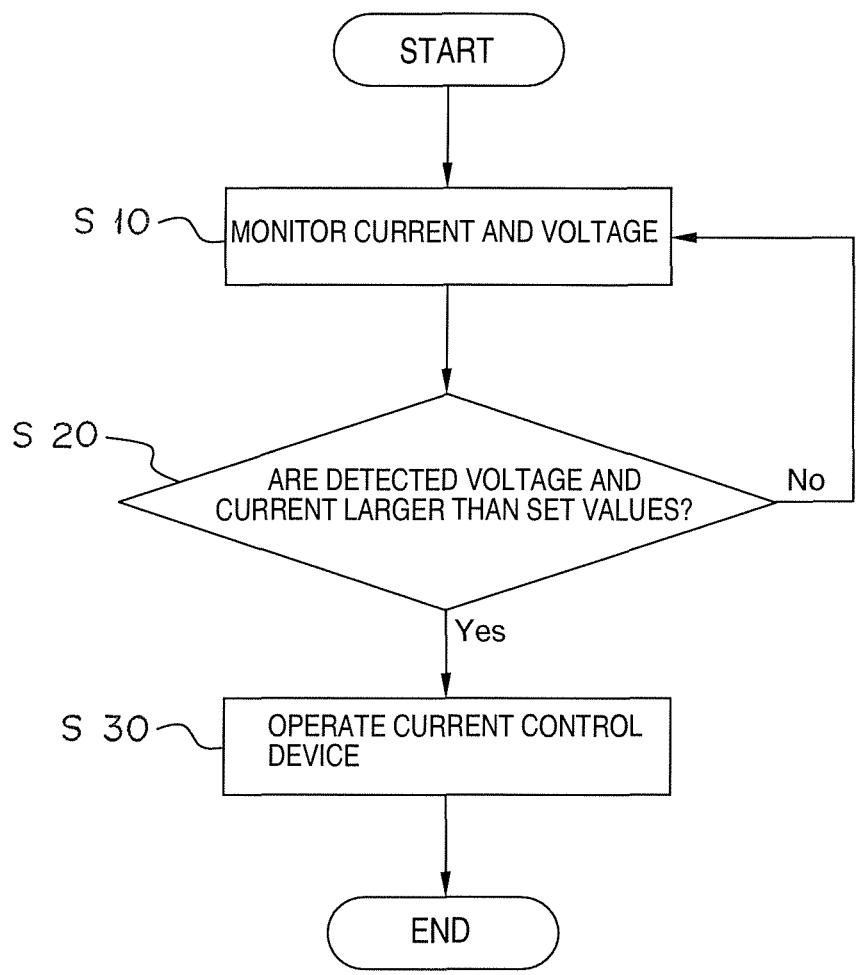
FIG. 10 is a flowchart illustrating operation of the control system shown in FIG. 9 in accordance with the third embodiment.

FIG. 9 is a block diagram of a control system for the electric power generating unit 40. FIG. 10 is a flowchart illustrating operation of the ECU or other control system shown in FIG. 9. The electric power generating unit control system includes the electric power generating unit 40, one or more current control devices 70 comprising a variable resistor or an ON/OFF circuit provided in the electric power generating unit 40, a current detecting device 80, a voltage detecting device 85, and an external control device 90 (e.g., an ECU). The current detecting device 80 detects a current in the current control device 70. The voltage detecting device 85 detects a voltage across the current control device 70). In this embodiment, it is assumed that an electronic control unit (ECU) installed in the vehicle serves as the external control device 90, but it is also acceptable to provide a dedicated control device as the external control device 90 for controlling the electric power generating unit 40.

In the third embodiment, the current control devices 70 are installed within the electric power generating unit 40. The current control devices 70 are provided in border portions that partition the positive electrode terminal plate 101 and the negative electrode terminal plate 102 as explained in the first embodiment and the second embodiment. In other words, the current control devices 70 are provided on border portions between regions into which the positive electrode terminal plate 101 and the negative electrode terminal plate 102 are partitioned. The current detecting device 80 functions as a current meter that detects a current flowing in the border portions. The voltage detecting device 85 functions as a voltage meter that detects a voltage existing across the same border portions. The external control device 90 (ECU) is contrived to operate the current control device 70 based on detection results obtained from the current detecting device 80 and the voltage detecting device 85. A short circuit occurring inside the electric power generating unit 40 is detected based on a relationship between a current detected by the current detecting device 80 and a voltage detected by the voltage detecting device 85. When a short circuit is detected in this manner, a current in the positive electrode terminal plate 101 or the negative electrode terminal plate 102 is limited or interrupted. The current in the positive electrode terminal plate 101 and the negative electrode terminal plate 102 is limited or interrupted by a command issued from the external ECU or other external control device 90 to the current control devices 70.

In this embodiment, when the current control devices 70 are variable resistors (current limiting devices), resistance values of the variable resistors (the current limiting devices) are controlled by the external control device 90. Alternatively, in this embodiment, when the current control devices 70 are ON/OFF circuits (current interrupting devices), the on/off statuses of the ON/OFF circuits are controlled by the external control device 90.

The variable resistors used in this embodiment can each be a resistor whose resistance value is literally controlled by the external control device 90 or a thyristor, transistor, or other semiconductor device that can be operate similarly to a variable resistor. The ON/OFF circuits presented in this embodiment can each be a very small relay with a mechanical contact or a thyristor, transistor, or other semiconductor device that can be function similarly to a switch. It should be clear to those skilled in the art that the variable resistors or the ON/OFF circuits of this embodiment can be applied to the terminal plates 101 and 102 in the same manner (position and arrangement) as the rectifying elements or fuses as described in the first and second embodiments.

The manner in which the electric power generating unit control system described above operates will now be explained based on the flowchart shown in FIG. 9.

The current detecting device 80 serves to monitor the magnitude of a current in the current control devices 70 (e.g., variable resistors or ON/OFF circuits). The voltage detecting device 85 serves to monitor the magnitude of a voltage existing across the current control device 70. For example, if this embodiment is applied to the first embodiment shown in FIG. 3(A), then the current detecting device 80 detects the magnitude of a current flowing from the region A to the region B through the current control device 70 (e.g., a first variable resistor or a first ON/OFF circuits) corresponding to the rectifying element or fuse 52A and the magnitude of a current flowing from the region C to the region B through the current control device 70 (e.g., a second variable resistor or a second ON/OFF circuits) corresponding to the rectifying element or fuse 52B. The voltage detecting device 85 detects a potential difference (voltage) between the region A and the region B and a potential difference (voltage) between the region C and the region B (S10). The control device 90 (e.g., ECU) determines if the magnitude of the current detected in the current control device 70 is larger than a set value and the magnitude of the voltage detected across the current control device 70 is larger than a set value (S20).

If the size of the current flowing through the current control device 70 and the size of the voltage across the current control device 70 are not larger than the set values (if result of S20 is "No"), then the control device 90 (e.g., ECU) determines that an internal short circuit is not occurring in the electric power generating unit 40 and returns to step S10 to monitor the size of the current flowing through the current control device 70 and the size of the voltage across the current control device 70.

Meanwhile, if the size of the current flowing through the current control device 70 and the size of the voltage across the current control device 70 are larger than the set values (if result of S20 is "Yes"), then the control device 90 (e.g., ECU) determines that an internal short circuit is occurring in the electric power generating unit 40 and the current control device 70 acts to isolate the region where the internal short circuit is occurring by increasing a resistance value of a variable resistor so as to decrease the size of the current flowing across a border portion or by setting an ON/OFF circuit to OFF so as to interrupt a current from flowing across a border portion (S30).

In this way, the control device 90 (e.g., ECU), i.e., an external control device, can control a current flowing in a planar direction between partitioned portions of the positive electrode terminal plate 101 and the negative electrode terminal plate 102 when an internal short circuit occurs inside the bipolar secondary battery. The external control device can also interrupt a current flowing in a planar direction between partitioned portions of the positive electrode terminal plate 101 and the negative electrode terminal plate 102 when an internal short circuit occurs inside the bipolar secondary battery.

Similarly to the first embodiment and the second embodiment, a bipolar secondary battery according to the third embodiment can be used to make a battery pack. Additionally, the bipolar secondary battery or battery pack can be installed in a vehicle. Furthermore, since such a battery pack or vehicle uses a bipolar secondary battery contrived to suppress or prevent heating caused by an internal short circuit, the battery can be prevented from causing heat damage.

Fourth Embodiment

Figure 13:
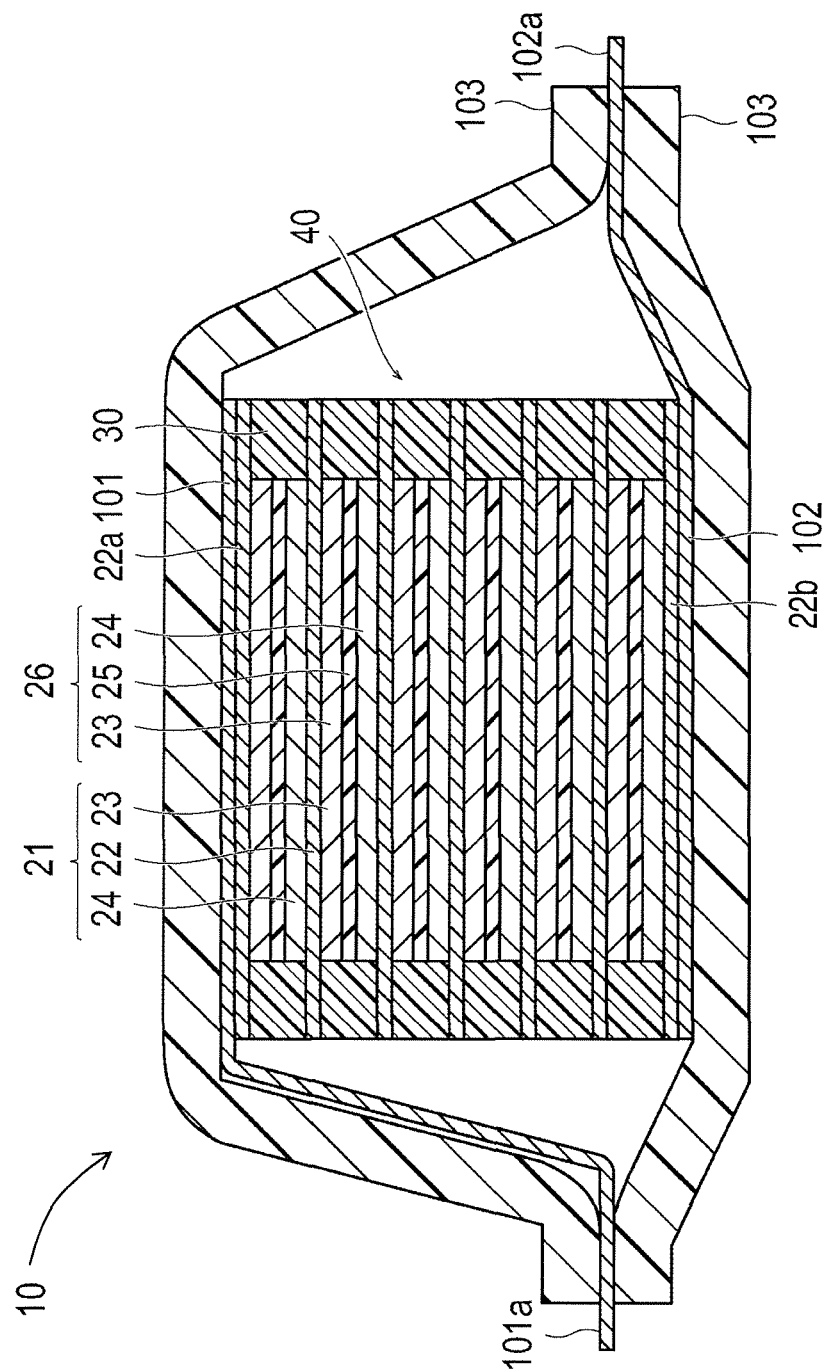
FIG. 13 is a cross sectional view of a bipolar secondary battery as seen along the section line 13-13 of the bipolar secondary battery shown in FIG. 1 in accordance with fourth and fifth embodiments.

FIG. 13 a schematic view (cross sectional view) showing an internal structure of a bipolar secondary battery according to a fourth embodiment. Similarly to the first to third embodiments, a bipolar secondary battery according to the fourth embodiment is basically made up of bipolar electrodes. More specifically, as shown in FIG. 13, a bipolar secondary battery 10 according to the fourth embodiment has the electric power generating unit 40 that uses the bipolar electrodes 21, each of which includes the collector 22 having the positive electrode active material layer 23 on one side and the negative electrode active material layer 24 on the other. The positive electrode active material layers 23 and the negative electrode active material layers 24 of adjacent bipolar electrodes 21 are arranged to face each other with the electrolyte later 25 in between.

The outermost layer at one stacking direction-facing end of the electric power generating unit 40 is the outermost collector 22a having only the positive electrode active material layer 23 on one side thereof. The outermost layer at the other stacking direction-facing end of the electric power generating unit 40 is the outermost collector 22b having only the negative active material layer 24 on one side thereof. The positive electrode terminal plate 101 is connected to one stacking direction-facing end of the electric power generating unit 40 and the negative electrode terminal plate 102 is connected to the other stacking direction-facing end for drawing current out of the electric power generating unit 40. In other words, the positive electrode terminal plate 101 is connected to the outermost collector 22a and the negative electrode terminal plate 102 is connected to the outermost collector 22b. End portions of the positive electrode terminal plate 101 and the negative electrode terminal plate 102 extend from the outer covering 103 to serve as tabs (battery terminals) 101a and 102b of the bipolar secondary battery.

Since the external appearance of the bipolar secondary battery 10 is similar to that of the bipolar battery 100 shown in FIG. 1, a separate drawing is not provided.

The fourth embodiment differs from the first to third embodiments with respect to the constituent features of the collectors 22, and the outermost collectors 22a and 22b, the positive electrode terminal plate 101, and the negative electrode terminal plate 102. However, the same reference numerals are used for these parts because the functions thereof in the bipolar secondary battery are basically the same as in the first to third embodiments. Explanations are not provided for other parts and features that are the same as in the first to third embodiments.

The collectors 22, and the outermost collectors 22a and 22b, of the fourth embodiment will now be explained (although the following explanation refers to the collector 22, the outermost collectors 22a and 22b serving as the outermost layers are the same). The collector 22 according to the fourth embodiment is a collector that employs a conductive resin. An example of a collector 22 employing a conductive resin is a collector 22 that includes a resin layer having a conductive property. Specific examples of ways in which a resin layer can be imparted with a conductive property include making the resin layer contain a resin and a conductive material (conductive filler) and making the resin layer out of a polymer material that is itself conductive (conductive polymer molecule). A resin layer containing a resin and a conductive material is preferred because both the resin and the conductive material can be selected.

A case in which the resin layer is made of a conductive polymer material whose molecular structure itself is conductive will now be explained. In this case, the entire collector 22 is made of the conductive polymer resin material. The conductive polymer is electrically conductive and is selected from among materials that are used as charge transfer media and are not conductive with respect to ions. Such conductive polymer molecules are believed to exhibit conductivity due to an energy band formed by a conjugated polyene. A representative example is conductive polyene polymers, which are used considerably in electrolytic capacitors. More specifically, preferred examples include polyanilines, polypyrols, polythiophenes, polyacetylenes, polyparaphenylenes, polyphenylenevinylenes, polyacrylonitriles, polyoxadiazoles, and mixtures of these. Among these polyanilines, polypyrols, polythiophenes, and polyacetylenes are particularly preferred from the standpoint of electron conductivity and the ability to be used stably inside a battery.

A preferred arrangement in which a resin layer is made of a non-conductive resin containing a conductive material will now be explained in detail. In this arrangement, a resin layer is provided on all or a portion of the collector 22 and the resin layer is made of a resin containing a conductive material such that the entire resin layer is conductive. The conductive material (conductive filler) is selected from among materials having an electrically conductive property. From the standpoint of achieving electrical conductivity while suppressing the transmission of ions inside the resin layer, it is preferable to use a material that is usable as a charge transfer medium but not conductive with respect to ions.

Specific examples of conductive materials include aluminum materials, stainless steel (SUS) materials, such carbon materials as graphite and carbon black, silver materials, gold materials, copper materials, and titanium materials, but the conductive materials that can be used are not limited to these. It is acceptable to use any one of the aforementioned conductive materials independently or to use two or more together. It is also acceptable to use an alloy of these materials. Silver, gold, aluminum, stainless steel, and carbon materials are preferred; among these carbon materials are particularly preferred. It is also acceptable for the conductive material to be a particulate ceramic material or a resin material coated or plated with a conductive material (i.e., one of the aforementioned conductive materials). The conductive material can be in a particulate shape (form) but it is not limited to a particulate form. For example, it is acceptable for the conductive material to be a filler-type conductive resin composition, such as carbon nanotubes.

Examples of carbon materials other than carbon black and graphite include carbon fibers and c/c composites (mixtures of graphite and carbon fibers). In addition to being excellent conductors, carbon black, graphite, and other carbon particles have very wide potential windows and are stable with respect to a wide range of positive electrode potentials and negative electrode potentials. Carbon particles are also extremely light and enable the mass of the battery to be held to a minimum. Since carbon particles are often used as conductivity enhancers for electrodes, the contact resistance is small when carbon particles used as a conductive filler contact carbon particles used as a conductivity enhancer in an electrode. Additionally, when carbon particles are used as conductive particles, the affinity with respect to an electrolyte can be lowered and a state in which the electrolyte does not readily penetrate into empty cavities (porosities) of the collector can be obtained by applying a hydrophobic treatment to the surface of the carbon.

While there are no particular limitations on the average particle size of the conductive material, the particle size is preferably from 0.01 to 10 µm. In this patent specification, "particle size" refers to the largest distance L between two points along an outline of a conductive material particle. A value used as an "average particle size" is calculated by finding an average of the particle sizes of particles observed in several fields to several tens of fields using a scanning electron microscope (SEM) or a transmission electron microscope (TEM). The particle sizes and average particle sizes of active material particles and other particles described later can be defined in a similar fashion.

When the resin layer is made of a resin containing a conductive material, it is acceptable for the resin to contain a polymer material that is not conductive and serves to bind the conductive material. By using a polymer material as a component material of the resin layer, the binding of the conductive material can be improved and the reliability of the bipolar secondary battery can be increased. The polymer material is selected from among materials that can withstand the positive electrode potentials and negative electrode potentials that will occur.

Preferred examples of non-conductive polymer resin materials that can be used include polyethylene (PE), polypropylene (PP), polyethylene terephthalate (PET), polyether nitrile (PEN), polyimide (PI), polyamide (PA), polytetrafluoroethylene (PTFE), styrene butadiene rubber (SBR), polyacrylonitrile (PAN), polymethyl acrylate (PMA), polymethyl methacrylate (PMMA), polyvinyl chloride (PVC), polyvinyl fluoride (PVF), epoxy resin, or a mixture of these. These materials have a very wide potential window and are stable with respect to both positive electrode potentials and negative electrode potentials. Since these materials are also lightweight, they can enable a bipolar secondary battery with a high output density to be obtained.

There are no particular limitations on the proportion of conductive material contained in the resin layer, but the mass of conductive material is preferably 1 to 30% of the total mass of the polymer material (non-conductive resin) and the conductive material. The resin layer can be imparted with a sufficient degree of electrical conductivity by using a sufficient amount of conductive material.

Although it is acceptable for the resin layer to contain other additives in addition to a conductive material and a resin, it is preferable for the resin layer to be made up of a conductive material and a resin. The resin layer can be manufactured using a well-known method. For example, a spray method or a coating method can be used to manufacture the resin layer. More specifically, one method is to make a slurry containing a polymer material, apply the slurry, and allow the slurry to harden. The specific type of polymer material used to make the slurry is a polymer material according to the preceding explanation and further explanation is omitted here. Another component that might be included in the slurry is a conductive material. Specific examples of a conductive particulate material are described above and an explanation of the same is omitted here. Another method is to mix a polymer material, a conductive particulate, and other additives using a well-known method and form the mixture into a film. Still another method is to fabricate a resin layer using an inkjet method, as described in Japanese Laid-Open Patent Publication No. 2006-190649.

While there are no particular limitations on the thickness of the collector 22, a thinner collector thickness is preferred from the standpoint of increasing an output density of the bipolar secondary battery. The resin collectors existing between the positive electrode and the negative electrode in the bipolar secondary battery can be thin because it is acceptable for a planar direction electrical resistance to be higher than in a stacking direction. More specifically, the thickness of each collector is, for example, 10 to 300 µm and preferably 20 to 60 µm or, more preferably, 20 to 50 µm. With a collector thickness in these ranges, a sufficient electron conductivity can be secured in at least the film thickness direction and the output density of the bipolar secondary battery can be increased while reducing the weight.

A distinctive characteristic of the collector 22 made by using a conductive resin is that the resistance is small in a film thickness direction (stacking direction of the single cells) and the resistance is high in a planar direction. The characteristic required of a collector in a bipolar secondary battery is that it has a sufficient electron conductivity in the film thickness direction (stacking direction). The difference between the resistances in the film thickness and planar directions helps suppress or prevent a concentration of current from occurring when an internal short circuit occurs. More specifically, if the resistance value in a planar direction of the collector 22 is high, then an electric current is suppressed or prevented from flowing through the collector 22 in the planar direction toward a portion where an internal short circuit has occurred. Thus, merely by using a resin collector, the flow of a current caused by an internal short circuit is suppressed or prevented and an increase in temperature caused by the internal short circuit can also be suppressed or prevented.

A collector having a sufficient electron conductivity in the thickness direction (film thickness direction) thereof can generally be obtained if the volumetric resistance in the film thickness direction is equal to or smaller than $10^2$ Ω-cm. Preferably, the volumetric resistance in the film thickness direction is from $10^2$ to $10^{-5}$ Ω-cm.

Meanwhile, it is acceptable for the surface resistance, which indicates a resistance in a planar direction, to be a value large enough not to allow a current to flow because it is not necessary to secure large electron conductivity in a planar direction. In terms of the surface resistance of a conductive resin, a concentration of current can be effectively avoided during an internal short circuit if the surface resistance is from, for example, $10^{16}$ to $10^{10}$ Ω/cm². It is also acceptable for the surface resistance to be higher or lower than this range.

It is also possible to achieve a difference between a thickness-direction resistance and a planar-direction resistance in a collector having a resin layer that has been imparted with electrical conductivity by being mixed with a conductive material. For example, consider a resin layer made using a resin film structure having many hollow cavities arranged to communicate in the film thickness direction and a conductive material that is filled into the cavities.

Figure 14:
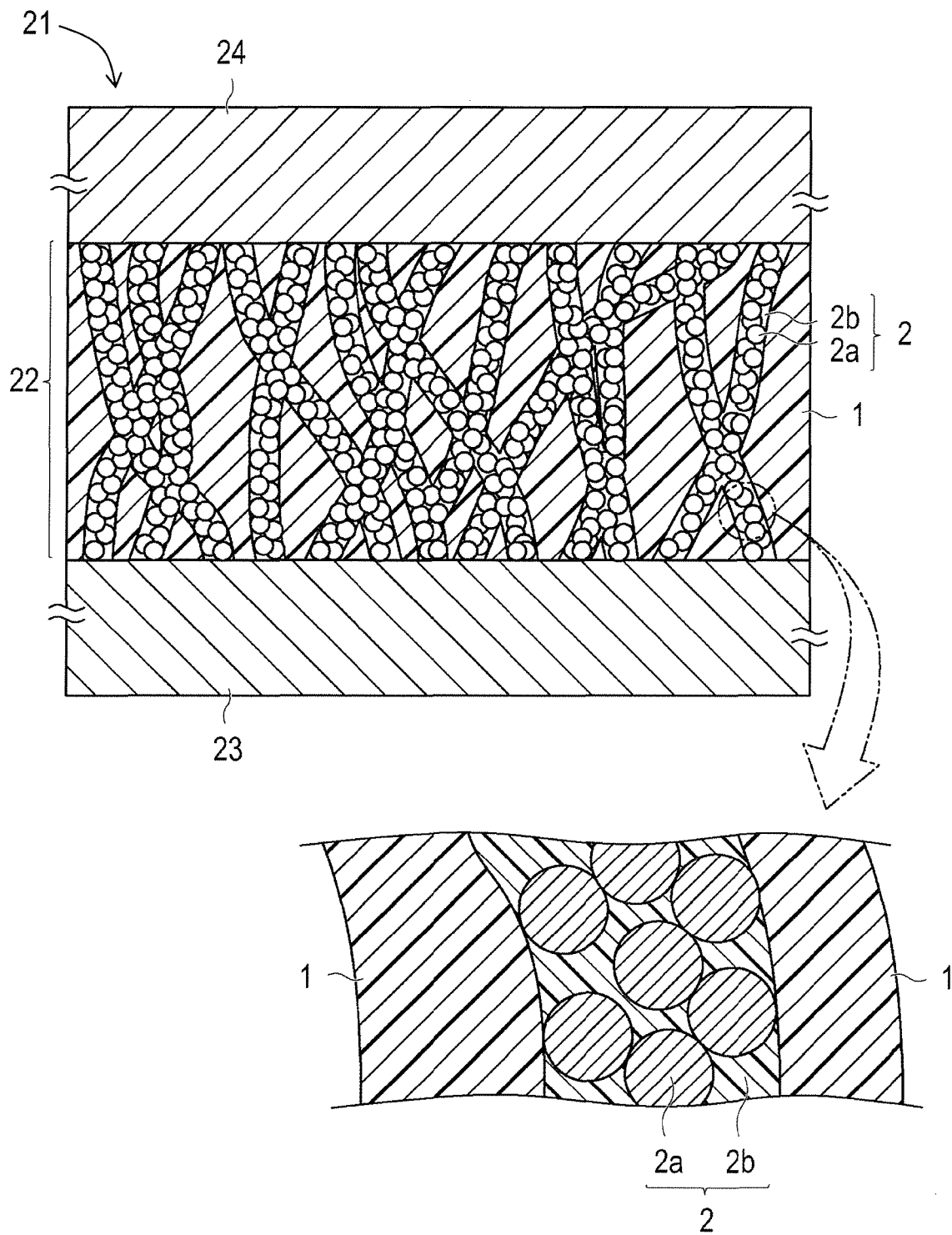
FIG. 14 is a cross sectional view of a bipolar electrode according to the fourth and fifth embodiments.

More specifically, as shown in FIG. 14, such a resin layer has an organic structural body 1 having many hollow cavities arranged to communicate in the film thickness direction and a conductive material 2 that is filled into the cavities of the organic structural body 1. Conductive material 2 filled into the cavity portions of the porous organic structural body 1 is made of a metal powder or other conductive material particles 2a and a binding polymer (binder) 2b for binding the conductive material particles 2a together and for binding the conductive material particles 2a to the organic structural body 1. The conductive material 2 is filled at a high density such that particles of the conductive material particles 2a contact one another along the film thickness direction (see the enlarged partial view of FIG. 14).

If the particles of conductive material particles 2a can be packed to a high enough density that they will not spill out of the cavities, then a binding polymer (binder) 2b is not necessary. Likewise, a binding polymer (binder) 2b is not necessary when the conductive material particles 2a itself has a binding property (e.g., magnetism) that enables it to bind inside the cavities.

When the collector 22 is made using a porous organic structural body 1, it is preferable for the porosity (void content) of the organic structural body 1 (i.e., the ratio of portions where the conductive material is introduced) to be from 10 to 90%, or more preferably from 30 to 90%. If the porosity is low, i.e., less than 10%, then the amount of conductive material (which provides most of the conductivity) will be small and it will be difficult to secure a sufficient conductivity in a film thickness direction. Meanwhile, if the porosity exceeds 90%, then the number of cavities (voids) that communicate with one another along a planar direction will be large and the conductive material filled into the cavities will make it easy for a current to flow in a planar direction. A situation in which current flows readily in a planar direction is undesirable because it conflicts with the idea of having a different resistance in the planar direction than in the film thickness direction.

By utilizing the structure described above, the collector 22 can be made in which the conductivity is high in the film thickness direction and almost non-existent in the planar direction (due to very little communication between cavities in planar directions). As a result, when an internal short circuit occurs, a current can be prevented from flowing in a planar direction in any given collector and the occurrence of a concentration of current caused by an internal short circuit can be suppressed or prevented.

There are other methods of obtaining a different resistance in a planar direction than in a film thickness direction. For example, the particles of conductive material mixed into the resin can be configured to be larger in a film thickness direction and smaller in a planar direction such that the particles are less likely to contact one another in a planar direction and the conductivity is only high in the film thickness direction. Thus, there are no limitations on the method used to obtain a different resistance in a planar direction than in a film thickness direction.

Figure 15:
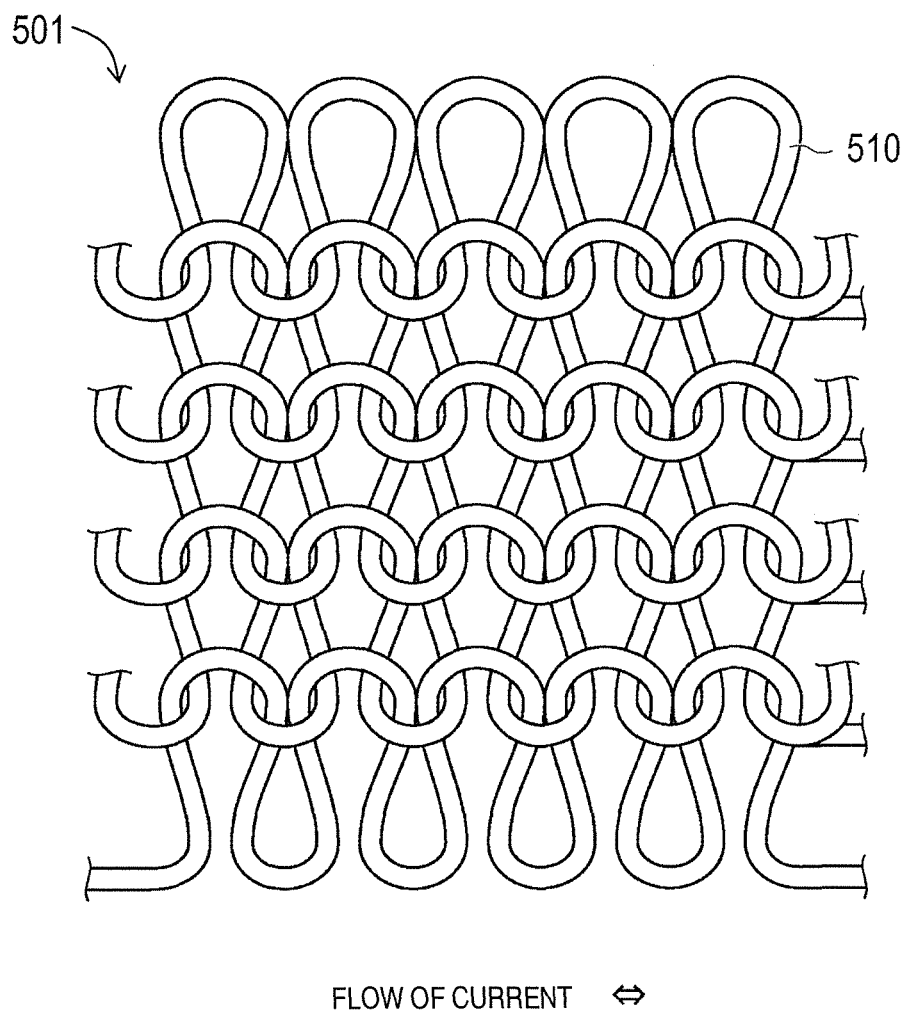
FIG. 15 is an enlarged, partial top plan view illustrating a terminal plate having a mesh-like structure according to the fourth embodiment.
Figure 16A:
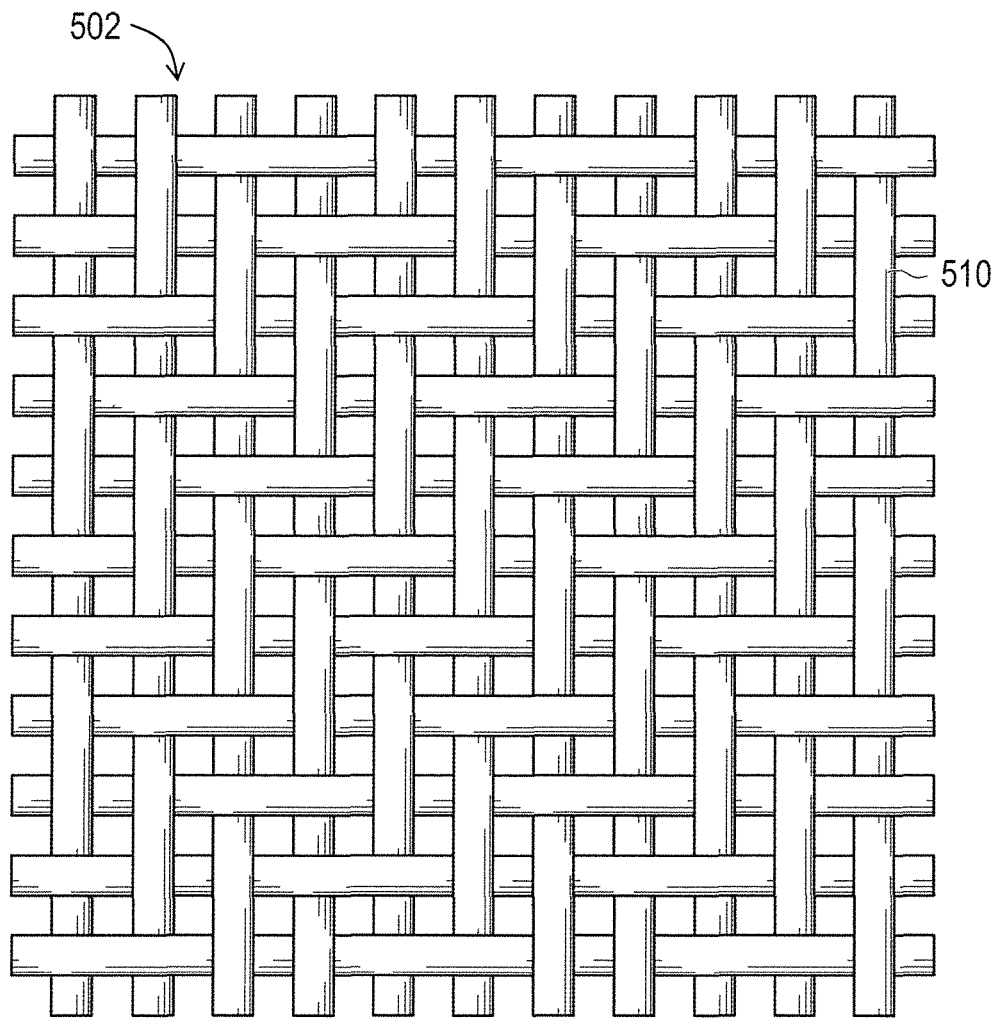
FIG. 16A is an enlarged, partial top plan view of a terminal plate having another mesh-like structure according to the fourth embodiment.
Figure 16B:
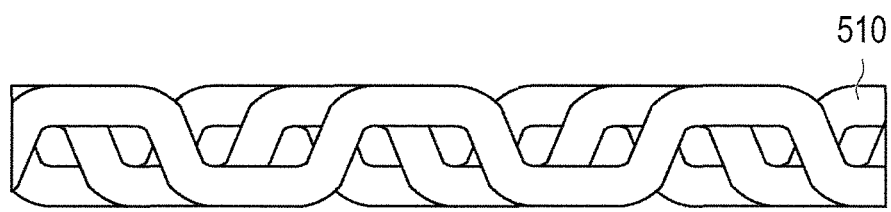
FIG. 16B is a transverse cross sectional view of the terminal plate having another mesh-like structure according to the fourth embodiment.
Figure 17A:
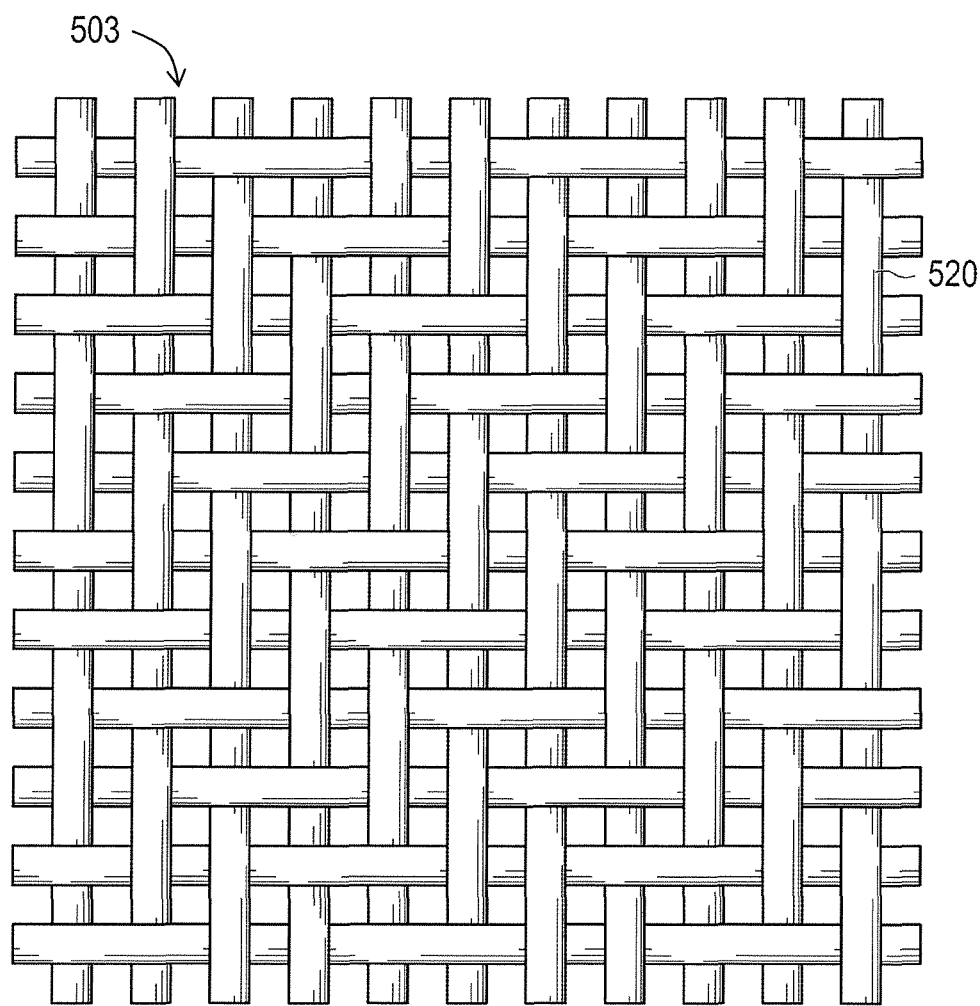
FIG. 17A is an enlarged, partial top plan view of a first variation of a terminal plate having a mesh-like structure according to the fourth embodiment.
Figure 17B:
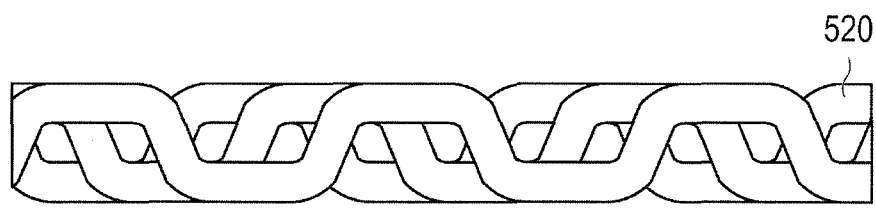
FIG. 17B is a transverse cross sectional view of the first variation of the terminal plate having the mesh-like structure according to the fourth embodiment.
Figure 17C:
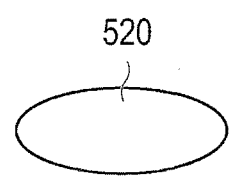
FIG. 17C is a cross sectional view of a strip-like material of the mesh structure according to the fourth embodiment.
Figure 18A:
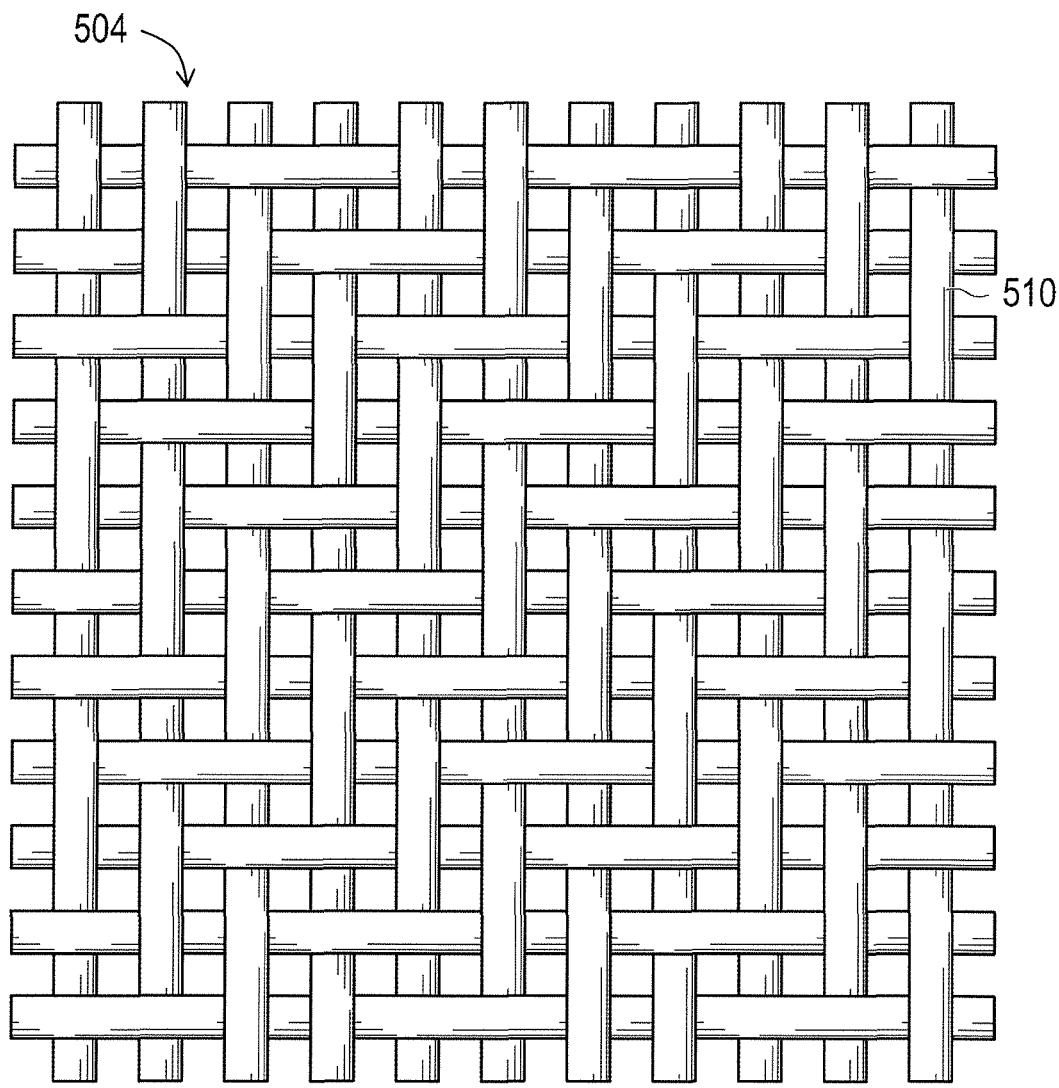
FIG. 18A is an enlarged, partial top plan view of a second variation of a terminal plate having a mesh-like structure according to the fourth embodiment.
Figure 18B:
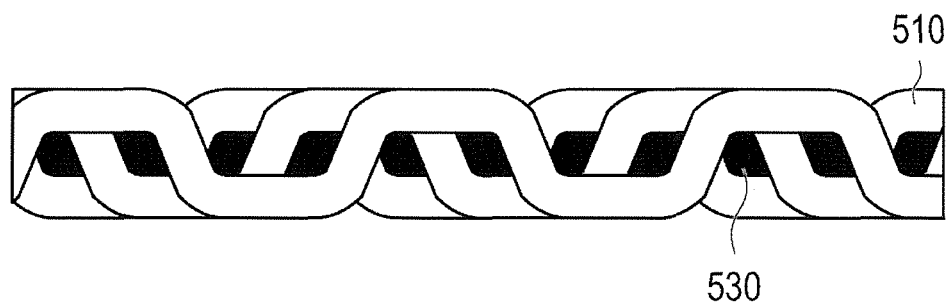
FIG. 18B is a transverse cross sectional view of the second variation of the terminal plate having the mesh-like structure according to the fourth embodiment.
Figure 19:
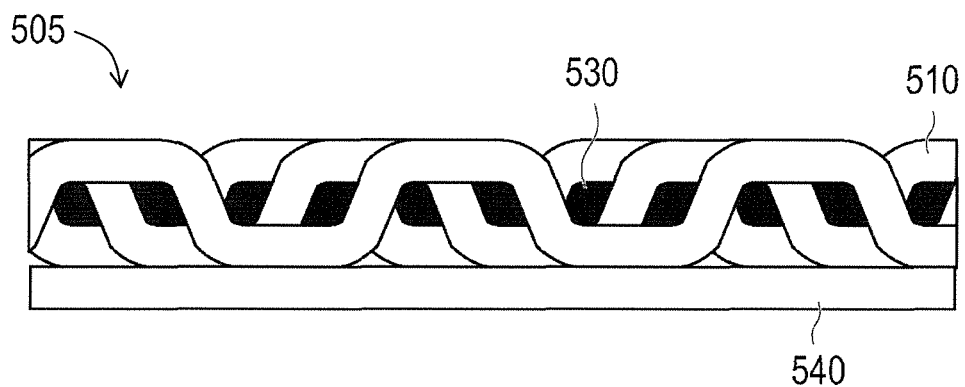
FIG. 19 is a transverse cross sectional view of a third variation of a terminal plate having a mesh-like structure according to the fourth embodiment.

Terminal plates according to the fourth embodiment will now be explained. In the fourth embodiment, the terminal plates have a mesh-like structure. More specifically, the mesh-like structure can be, for example, a knit-like structure obtained by interweaving a plurality of strands of a wire-like material as shown in FIG. 15. FIGS. 16A and 16B show a woven structure in which strands of a wire-like material are woven together. FIGS. 17A to 18C show a variation of the woven structure (mesh-like structure) in which the cross sectional shape of the fibers is elliptical. FIGS. 18A and 18B show a woven structure (mesh-like structure) in which an insulating thermal resin has been embedded into the structure. FIG. 19 shows a woven structure (mesh-like structure) that is embedded with an insulating resin and further provided with a metal thin film.

In the fourth embodiment, the mesh-like structure of the terminal plates serves to suppress or interrupt a concentration of current. The aforementioned mesh-like structures will now be explained in more detail.

FIG. 15 shows an example of a mesh-like structure used in a terminal plate. The strand material used to form the mesh is a conductive fiber 510 (including single strand, same applies hereinafter) and is knitted to form a terminal plate 501 having a knit-like structure. FIG. 16 shows another example, in which the fibers 510 (strand material) are simply woven in a plain weave pattern to obtain a terminal plate 502 having a woven structure. FIG. 16A is a top plan view and FIG. 16B is a cross sectional view.

Although the terms "terminal plate 501" and "terminal plate 502" are used to explain the fourth embodiment, both terms refer to the positive electrode terminal plate 101 and the negative electrode terminal plate 102 shown in FIG. 13. The terminal plates 503, 504, 505, and 506 mentioned in the explanations that follow also correspond to both the positive electrode terminal plate 101 and the negative electrode terminal plate 102.

In the knitted-structure terminal plate 501 and the woven-structure terminal plate 502, current flows chiefly through individual fibers 510. While there is some transfer of current through portions where fibers contact one another, the effect of contact resistance causes such currents to be smaller than currents flowing through individual fibers.

If a knitted-structure terminal plate 501 or a woven-structure terminal plate 502 contacts a collector 22 inside the battery (excluding the outermost collectors 22a and 22b, which are arranged to contact the terminal plates), then a short circuit will occur. A concentration of current will occur at the portion where the internal short circuited occurred and the same portion will undergo heating caused by the current. The heating will melt and sever a portion of the fiber and current will no longer flow through the severed portion. As a result, heating of the bipolar secondary battery caused by the internal short circuit can be prevented.

The conductive fiber serving as the strand material can be single-strand aluminum or copper wire or single strands or fibers of a conductive resin. Any kind of strand material is acceptable as long as it melts and severs at a prescribed temperature. The prescribed temperature at which the strand material should sever (hereinafter called "severance temperature") will be explained later.

The knitted terminal plate 501 and the woven terminal plate 502 function as elastic bodies and are thus different from a metal foil. The knitted terminal plate 501 can be made to have a particularly high elastic force because of its knitted structure. Thus, expansion and contraction of the electrodes during charging and discharging and expansion and contraction of parts due to a thermal cycle can be absorbed and the durability of the terminal plates with respect to such deformation and use is improved. When a knitted structure is used, the lengthwise direction of the individual fibers is the direction in which the current is drawn out of the battery (output direction). In other words, the fibers are oriented in the direction of the tabs 101a and 102b of the positive electrode terminal plate 101 and the negative electrode terminal plate 102 shown in FIG. 13. By orienting the fibers in such a direction, the terminal plate 101 can be made such that current flows readily in the output direction.

The knitted or woven structure can be obtained by using a normal knitting or weaving manufacturing process with a conductive fiber or a metal strand material.

Now a first variation of terminal plate having mesh-like structure will now be discussed. FIGS. 17A to 17B show a variation of a knitted or woven structure (mesh-like structure) in which a cross section of a fiber 520 (strand material) used to make the knitted or woven structure is elliptical. FIG. 17A is a planar view of a single strand of the fiber 520. FIG. 17B is a cross sectional view of a single strand of the fiber 520. FIG. 17C is a cross sectional view of a single strand of the fiber 520.

As shown in FIG. 17, when a fiber 520 (strand material) having an elliptical cross sectional shape is used, the fibers 520 are arranged in the weave such that the flattened direction (i.e., the elongated direction of the elliptical cross section) is oriented in a planar direction of the terminal plate 503. In this way, the contact surface areas of the terminal plates with the outermost collectors 22a and 22b of the electric power generating unit 40 can be increased. As a result, the contact resistance with respect to the outermost collectors 22a and 22b can be reduced and electric power can be collected more efficiently from the electric power generating unit 40 and fed to the tabs 101a and 102a. The effect of suppressing or preventing a concentration of current when an internal short circuit occurs is the same as with the structures shown in FIGS. 15 and 16.

Now a second variation of terminal plate having mesh-like structure will now be discussed. FIG. 18 shows another variation of the fourth embodiment in which a terminal plate 504 having a knitted or woven structure (mesh structure) is embedded with an insulating resin. FIG. 18A is a top plan view and FIG. 18B is a cross sectional view.

This structure is obtained by embedding an insulating resin 530 into any of the knitted or woven structures shown in FIGS. 15 to 17. FIG. 18 shows the structure illustrated in FIG. 16 for the purpose of explaining this variation, but any of the knitted or woven structures shown in FIGS. 15 to 17 is acceptable.

By embedding an insulating resin 530 into a knitted or woven structure, the individual fibers making up the knitted or woven structure can be insulated from one another. As a result, current flows only within individual fibers and does not flow across contacting portions. Thus, the fibers become severed due to increased temperature at portions where a current concentration caused by an internal short circuit occurs and current can be prevented from flowing to other fibers from a portion where a current concentration has occurred.

An example of how a terminal plate 504 having a resin embedded structure can be manufactured will now be explained.

Examples of insulating resins that can be embedded in a mesh structure include polyethylene (PE), polypropylene (PP), polyethylene terephthalate (PET), polyether nitrile (PEN), polyimide (PI), polyamide (PA), polytetrafluoroethylene (PTFE), styrene butadiene rubber (SBR), polyacrylonitrile (PAN), polymethyl acrylate (PMA), polymethyl methacrylate (PMMA), polyvinyl chloride (PVC), polyvinyl fluoride (PVF), epoxy resin, or a mixture of these. These resin materials have a very wide potential window and are stable with respect to both positive electrode potentials and negative electrode potentials. Since these materials are also lightweight, they can enable a bipolar secondary battery with a high output density to be obtained.

When any of the aforementioned polymer resins is embedded into a woven structure, the woven structure is immersed in a polymer material that has been dissolved in a solvent and the polymer material is allowed to soak into the woven structure. The woven structure is then dried to remove the solvent and obtain a woven structure embedded with resin. Next, a surface of the conductive fibers (or metal) of the resin-embedded woven structure are exposed by grinding or polishing a surface of the resin-embedded woven structure so as to cut the resin portion and expose the conductive fiber (or metal). The surface where the conductive fiber (or metal) is made to be exposed is on the side of the terminal plate that will contact the outermost collector 22a or 22b of the electric power generating unit 40.

Now a third variation of terminal plate having mesh-like structure will now be discussed. Another variation of the fourth embodiment is shown in FIG. 19. In this variation, a conductive thin film 540 is provided on a surface of a terminal plate 505 having a woven structure embedded with an insulating resin (the structure shown in FIG. 18). The surface is on a side of the terminal plate 505 that will contact the outermost collector 22a or 22b of the electric power generating unit 40. FIG. 19 is a cross sectional view of the terminal plate 505. A top plan view of the same is omitted because it would appear the same that of the resin-embedded structure shown in FIG. 18.

The conductive thin film 540 is a metal film applied to a surface of the insulating resin-embedded woven structure by, for example, vapor deposition or sputtering. By providing metal on a surface of the woven structure using vapor deposition or sputtering, the metal can be made to adhere securely to the surfaces of all of the fibers of the woven structure. Also, the deposited metal increases the contact surface area between the terminal plate 505 and the outermost collector 22a or 22b of the electric power generating unit 40. Consequently, the contact resistance between the woven terminal plate 505 and the electric power generating unit 40 can be reduced.

The conductive thin film 540 is preferably made of aluminum, copper, or another metal having a high conductivity. The film thickness is preferably equal to or smaller than 1 μm and approximately 200 nm is sufficient. It is not desirable for the film thickness to exceed 1 μm because there is a possibility that the fibers will not sever in response to an increase in temperature when the film is thicker. It is acceptable to assume that the minimum allowable film thickness is the smallest thickness that can be made by vapor deposition or sputtering. The function of the conductive thin film 540 is to increase the surface contact area with respect to the outermost collectors 22a and 22b and it can serve this function sufficiently well even if it is very thin. In other words, the conductive thin film 540 itself does not need to function as a terminal plate for transferring current.

It is also acceptable for the conductive thin film 540 to be formed by a method other than vapor deposition or sputtering.

With a sufficiently thin film, when a concentration of current occurs as a result of an internal short circuit, fibers sever in a portion where the current concentration occurred due to an increase in temperature. Under normal conditions, electric power can be efficiently collected from the electric power generating unit 40 and transferred to the tabs 101a and 102a.

The severance temperature will now be explained. The severance temperature differs depending on the temperature at which the bipolar secondary battery will be used. For example, when a lithium ion battery for an automotive application is used at 60° C., it is preferable for the fibers to sever at 65 to 150° C. If the severance temperature is set below 65° C., then there is a possibility that the fibers will sever at a normal usage temperature and the battery will not serve the function for which it is intended. Conversely, if the severance temperature is higher than 150° C., then there is a possibility that the temperature of the entire battery will increase if a localized temperature increase is not held in check. Thus, the severance temperature should be set as appropriate based on the materials used in the bipolar secondary battery and the application of the bipolar secondary battery, and no limitations with respect to the severance temperature will be stated in this specification.

The fibers used to fabricate a terminal plate having a knitted structure or a woven structure can be, for example, fibers of a conductive resin or single strands of metal.

Fibers made of a conductive resin can be made of a conductive polymer or a resin containing a conductive material (these are referred to collectively as "conductive resin") that has been processed into a fiber-like state. Acceptable polymers and conductive materials are the same as those described previously regarding the conductive resin collector.

When such conductive resins are used for the fibers, in addition to contriving the fibers to sever at the severance temperature, it is necessary to secure a sufficient degree of conductivity in order to allow current collected from the electric power generating unit 40 to flow toward the tabs during normal conditions. Here, "normal conditions" refers to a state in which a current concentration caused by an internal short circuit is not occurring. Thus, a volumetric resistance of each individual fiber is set to be $10^2$ Ω-cm or, more preferably, $10^2$ to $10^{-5}$ Ω-cm. When the volumetric resistance is within this range, the woven fibers can transfer the current collected from the electric power generating unit 40 to toward the tabs in an efficient fashion.

It is also acceptable for the fibers to made of thin strands of metal. The metal used can be, for example, aluminum, copper, or stainless steel. At 20° C. the volumetric resistance of aluminum is $2.8 \times 10^{-6}$ Ω-cm, the volumetric resistance of copper is $1.7 \times 10^{-6}$ Ω-cm, and the volumetric resistance of stainless steel (SUS410) is $62.2 \times 10^{-6}$ Ω-cm Other metal materials can also be used. The metal strands can be made thicker to allow more current to flow under normal conditions, and an alloy can be used such that the strands sever immediately at the severance temperature.

The conductive fibers or metal strands are made to an appropriate thickness to obtain the aforementioned severance temperature.

Figure 20A:
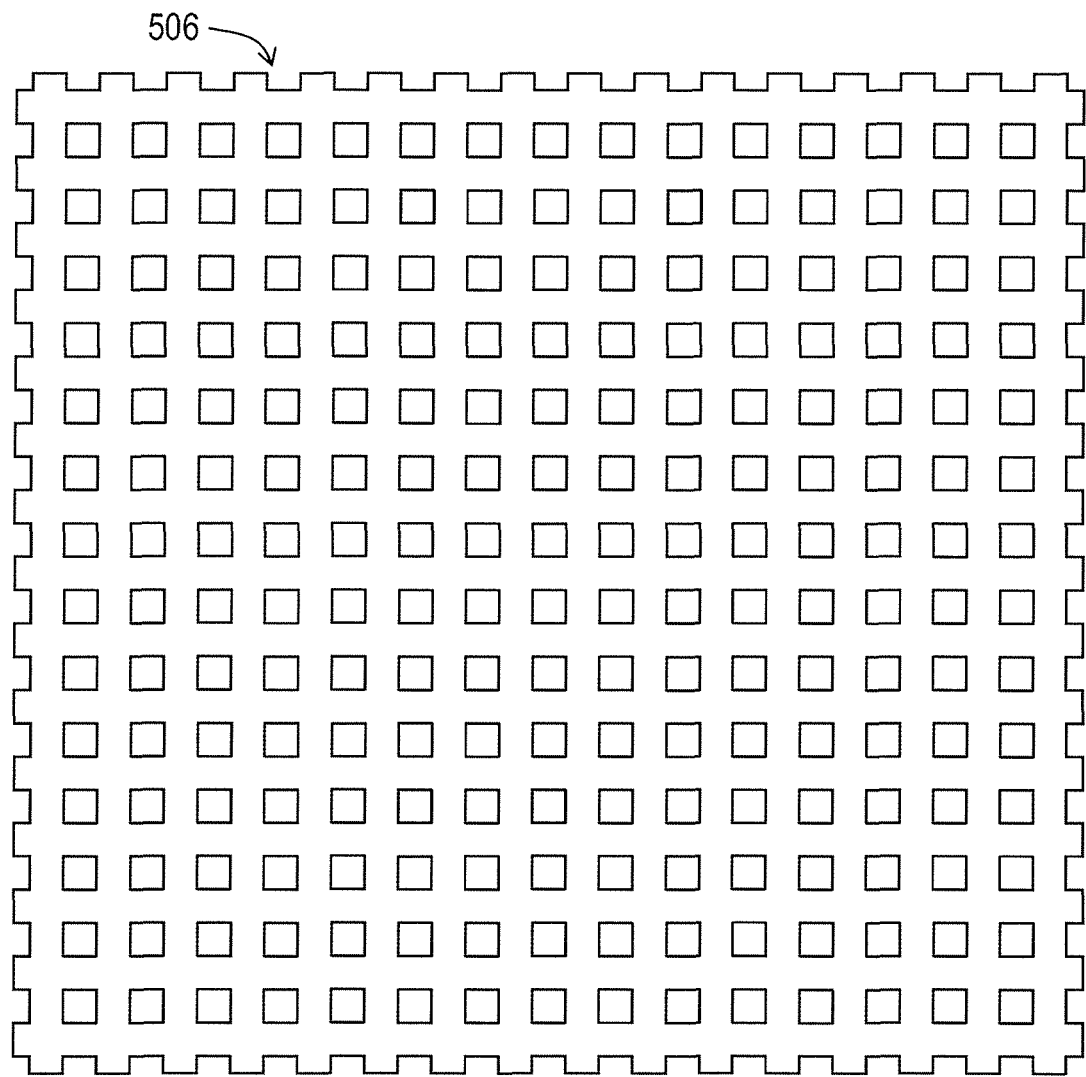
FIG. 20A is an enlarged, partial top plan view of a fourth variation of a terminal plate having a non-woven mesh-like structure according to the fourth embodiment.
Figure 20B:
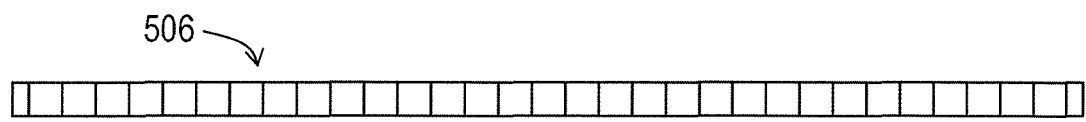
FIG. 20B is a transverse cross sectional view of the fourth variation of the terminal plate having the-woven mesh-like structure according to the fourth embodiment.

Now a fourth variation of terminal plate having mesh-like structure will now be discussed. Although heretofore the fourth embodiment is explained based on examples in which a mesh-like structure is obtained by making a knitted structure or a woven structure, a terminal plate according to the fourth embodiment is not limited to a knitted or woven structure. For example, as shown in FIG. 20, it is acceptable to make a punched mesh 506 (metal mesh structure) by die punching a single metal sheet. In such a case, the mesh strands making up the mesh are formed to such a width that they sever at the severance temperature. As a result, when a concentration of current caused by an internal short circuit occurs, mesh strands in a portion where the current concentration occurred become severed due to a temperature increase in that portion and a temperature increase of the bipolar secondary battery can be suppressed or prevented.

Working Examples of the Fourth Embodiment

A trial sample of a bipolar secondary battery constructed according to the fourth embodiment was fabricated and a cycle test characteristic thereof was evaluated.

The structure of the bipolar secondary battery sample will now be explained.

The positive electrode material was made by mixing the following materials at prescribed proportions.

$LiMn_2O_4$ (85 wt %) was used as a positive electrode active material.

Acetylene black (5 wt %) was used as a conductivity enhancer.

PVDF (10 wt %) was used as a binder.

NMP was used as a solvent for adjusting the viscosity of a slurry of the positive electrode materials to a viscosity suitable for coating.

One surface of a resin collector was coated with the slurry and then dried to obtain a positive electrode.

The negative electrode material was made by mixing the following materials at prescribed proportions.

Hard Carbon (85 wt %) was used as a negative electrode active material.

Acetylene black (5 wt %) was used as a conductivity enhancer.

PVDF (10 wt %) was used as a binder.

NMP was used as a solvent for adjusting the viscosity of a slurry of the negative electrode materials to a viscosity suitable for coating.

One surface of a resin collector was coated with the slurry and then dried to obtain a collector with a positive electrode on one side and a negative electrode on the other, i.e., a complete bipolar electrode.

In addition to the method described above, the positive electrode and the negative electrode can be fabricated by transferring an electrode comprising a pre-coated metal foil to a resin collector.

The collector was fabricating using polyethylene, polyimide, or other resin material as a base material, mixing the base material with acetylene black (carbon material) as a conductive material, and extruding the mixture to form the collector as a thin film.

The electrolyte material was made by mixing the following materials at prescribed proportions.

PC and EC were mixed at a ratio of 1 to 1 and 1M $LiPF_6$ (90 wt %) was added as a lithium salt to obtain an electrolyte solution.

Bipolar electrodes fabricated as described above, a seal material, and separators were stacked (laminated) on one another and pressed (pressure and heat) from above and below on three sides of a peripheral portion so as to fuse and seal the layers, thereby obtaining an electric power generating unit. The pressing conditions were 0.2 MPa, 200° C., and 5 seconds.

The seal material was a polyethylene-based thermoplastic resin; a polypropylene or an epoxy resin is also acceptable.

A liquid electrolyte was injected from the remaining side that was not pressed and, then, that remaining side was pressed and sealed.

Terminal plates capable of covering an entire projected face of the bipolar secondary battery element were fabricated according to the working examples explained below. The terminal plates were arranged to sandwich the laminated electric power generating unit, and the terminal plates and electric power generating unit were covered with an aluminum laminate as an outer covering and vacuum sealed. The entire bipolar secondary battery unit was compressed on from both sides at atmospheric pressure to increase the contact between the terminal plates and the electric power generating unit, thereby completing fabrication of a gel electrolyte bipolar secondary battery sample.

The evaluation method will now be explained.

Working Example 1

In this working example, terminal plates 502 having the woven structure shown in FIG. 16 were used as the terminal plates of a bipolar secondary battery sample. The woven structure was made of aluminum strands having a diameter of 100 μm and woven to be spaced apart by 100 μm so as to target a severance temperature of 100° C.

An initial charging of the bipolar secondary battery sample equipped with the terminal plates 502 was conducted and the initial voltage was checked. Next, a localized voltage was applied to the battery from a surface of the outer covering to establish contact between an internal collector and a terminal plate and induce an internal short circuit.

A charge/discharge cycle test was then conducted at 50° C. The initial voltage was maintained even after more than 50 cycles, i.e., a good cycle characteristic was exhibited. A surface temperature of the outer covering was also monitored during the charge/discharge cycle test and was found not to exceed 50° C., which was the ambient temperature during the test.

Working Example 2

In this working example, terminal plates 503 having the woven structure shown in FIG. 17 were used as the terminal plates of a bipolar secondary battery sample. The woven structure was made of aluminum strands whose cross sectional shape has a short diameter of 50 μm and a long diameter of 200 μm. The strands were woven to be spaced apart by 100 μm and the woven structure was contrived to target a severance temperature of 100° C.

An initial charging of the bipolar secondary battery sample equipped with the terminal plates 503 was conducted and the initial voltage was checked. Next, a localized voltage was applied to the battery from a surface of the outer covering to establish contact between an internal collector and a terminal plate and induce an internal short circuit.

A charge/discharge cycle was then conducted at 50° C. The initial voltage was maintained even after more than 50 cycles, i.e., a good cycle characteristic was exhibited. A surface temperature of the outer covering was also monitored during the charge/discharge cycle test and was found not to exceed 50° C., which was the ambient temperature during the test.

Working Example 3

In this working example, terminal plates 504 having the woven structure embedded with an insulating resin shown in FIG. 18 were used as the terminal plates of a bipolar secondary battery sample. The woven structure was made of aluminum strands having a diameter of 100 μm and woven to be spaced apart by 100 μm so as to target a severance temperature of 100° C. A polyethylene-based thermoplastic resin was used as the embedded resin. After the resin was embedded into the woven structure, the aluminum strands were exposed at the surface that would contact the electric power generating unit.

An initial charging of the bipolar secondary battery sample equipped with the terminal plates 504 was conducted and the initial voltage was checked. Next, a localized voltage was applied to the battery from a surface of the outer covering to establish contact between an internal collector and a terminal plate and induce an internal short circuit.

A charge/discharge cycle was then conducted at 50° C. The initial voltage was maintained even after more than 50 cycles, i.e., a good cycle characteristic was exhibited. A surface temperature of the outer covering was also monitored during the charge/discharge cycle test and was found not to exceed 50° C., which was the ambient temperature during the test.

Working Example 4

In this working example, terminal plates 505 having the woven structure shown in FIG. 19, which is embedded with an insulating resin and provided with a thin film of copper, were used as the terminal plates of a bipolar secondary battery sample. The woven structure was made of aluminum strands having a diameter of 100 μm and woven to be spaced apart by 100 μm so as to target a severance temperature of 100° C. A polyethylene-based thermoplastic resin was used as the embedded resin. After the resin was embedded into the woven structure, the aluminum strands were exposed at the surface that would contact the electric power generating unit. The thin film of copper was vapor deposited to a thickness of 200 nm on the surface where the aluminum was exposed.

An initial charging of the bipolar secondary battery sample equipped with the terminal plates 505 was conducted and the initial voltage was checked. Next, a localized voltage was applied to the battery from a surface of the outer covering to establish contact between an internal collector and a terminal plate and induce an internal short circuit.

A charge/discharge cycle was then conducted at 50° C. The initial voltage was maintained even after more than 50 cycles, i.e., a good cycle characteristic was exhibited. A surface temperature of the outer covering was also monitored during the charge/discharge cycle test and was found not to exceed 50° C., which was the ambient temperature during the test.

Comparative Example 1

As a comparative example, a bipolar secondary battery sample was fabricated using a single sheet of aluminum foil for each of the terminal plates. An initial charging of the bipolar secondary battery sample equipped with aluminum foil terminal plates was conducted and the initial voltage was checked. Next, a localized voltage was applied to the battery from a surface of the outer covering to establish contact between an internal collector and a terminal plate and induce an internal short circuit.

Thereafter, the battery voltage would not rise when an attempt to charge the battery sample was made at 50° C. Consequently, repeated charging and discharging could not be conducted.

The results obtained from the working examples indicate that even when an internal short circuit occurs, a temperature of a bipolar secondary battery according to the fourth embodiment does not increase and the battery can be charged and discharged repeatedly.

The effects exhibited by the fourth embodiment will now be explained.

In the fourth embodiment, a terminal plate has a mesh-like structure and each individual strand of material making up the mesh is contrived to become severed due to heat when an internal short circuit occurs. Consequently, the temperature of the bipolar secondary battery as a whole does not increase when an internal short circuit occurs. Since any unnecessary concentration of current is interrupted, a more uniform current distribution and a more uniform temperature distribution can be maintained and the service life of the battery can be improved. Causes for an internal short circuit include, for example, a force acting on the bipolar secondary battery as a whole and penetration of a conductive foreign object into the battery through the outer covering (e.g., a nail piercing the battery).

By using a knitted or woven structure to obtain a mesh-like structure, a terminal plate having excellent pliability can be obtained and the terminal plate can accommodate expansion and contraction of the bipolar secondary battery as a whole during charging and discharging without causing pressure to develop inside the battery.

By using a strand material having an elliptical cross sectional shape to form a mesh-like structure, a larger contact surface area can be achieved between the terminal plate and the electric power generating unit and the terminal plate can draw current from the electric power generating unit more efficiently.

By embedding an insulating resin into the mesh-like structure, the transfer of electricity between strands of the mesh material can be prevented. Thus, when an internal short circuit occurs, the current can be prevented from flowing through other strands.

When an insulating resin is embedded into the mesh structure of the terminal plate, the terminal plate can be enabled to draw current from the electric power generating unit more efficiently by providing a conductive thin film on a surface of the terminal plate (on the side that will contact the electric power generating unit).

A terminal plate having a mesh-like structure made of metal can also be fabricated by die punching. A die punched metal mesh can be manufactured easily.

A bipolar secondary battery according to the fourth embodiment can also be used to make a battery pack, similarly to the first to third embodiments. Additionally, the bipolar secondary battery or battery pack can be installed in a vehicle. Furthermore, since such a battery pack or vehicle uses a bipolar secondary battery contrived to suppress or prevent heating caused by an internal short circuit, the battery can be prevented from causing heat damage.

Fifth Embodiment

Figure 21:
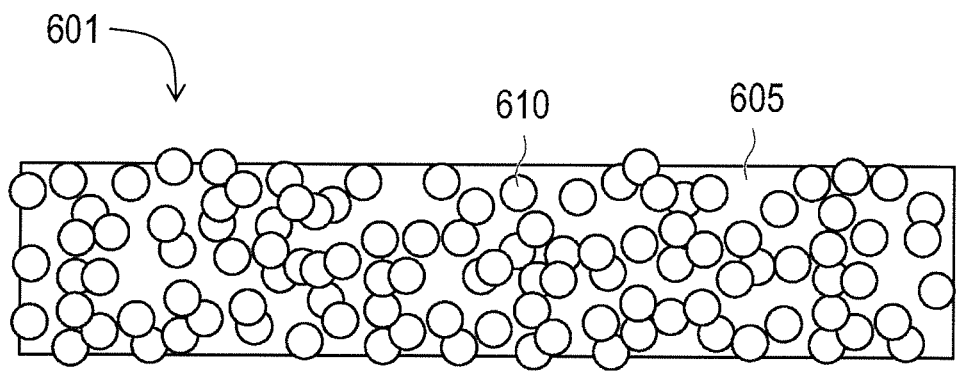
FIG. 21 is a cross sectional view illustrating a terminal plate made of a conductive resin according to the fifth embodiment.

A bipolar secondary battery according to the fifth embodiment is basically the same as a bipolar secondary battery according to the fourth embodiment except for the constituent features of the terminal plates. Explanations of parts other than the terminal plates are omitted in the following explanation because the other parts are the same as in the fourth embodiment. FIG. 21 is a cross sectional schematic view of a terminal plate 601 according to the fifth embodiment. The terminal plate 601 is contrived to be used as the positive terminal plate 101 or the negative terminal plate 102 shown in FIG. 13.

This terminal plate 601 includes a conductive resin layer 605 made of a resin mixed with a conductive material (conductive filler) 610. The terminal plate 601 functions to suppress or interrupt a concentration of current.

By adjusting the proportion of conductive material 610 mixed into the resin material, current is enabled to flow more readily in a planar direction and a tensile strength of the resulting terminal plate is made to be lower than a tensile strength of a collector.

Figure 22:
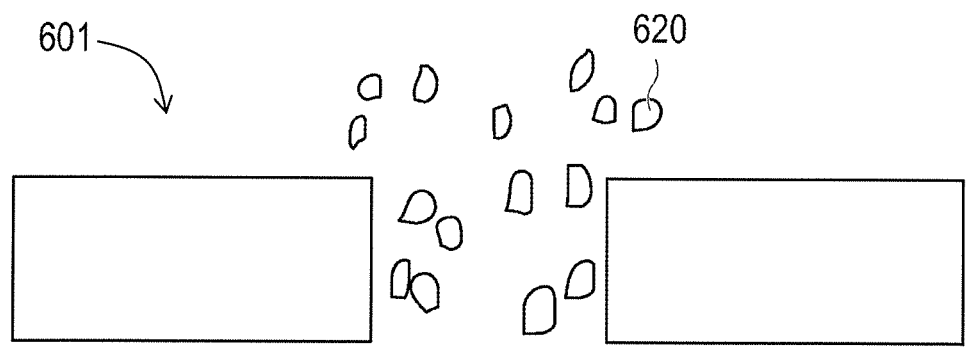
FIG. 22 is a diagram illustrating how a terminal plate made of a conductive resin according to the fifth embodiment acts to prevent an internal short circuit.

FIG. 22 is a diagram form explaining how the terminal plate 601 prevents a concentration of current from occurring. As shown in FIG. 22, since the tensile strength of the terminal plate 601 is small, the terminal plate 601 breaks when it experiences a force capable of causing an internal short circuit. The break causes the conductive material 610 serving as current carrying elements to scatter along with some of the resin. The figure shows scattered pieces 620 of resin and conductive material. Since current cannot flow in the broken portion, a concentration of current can be prevented from occurring due to the internal short circuit. Also, since the tensile strength of the terminal plate 601 is lower than that of a collector, when a force generated by an internal short circuit reaches the terminal plate 601, the terminal plate 601 can break reliably and cause the conductive material 610 serving as current carrying elements in the conductive resin to scatter.

The tensile strength of the terminal plate 601 in a standalone state is preferably not larger than, for example, 10 N/mm$^2$. Thus, if a force exceeding 10 N/mm$^2$ acts against the terminal plate 601, then the terminal plate 601 will break and the conductive material 610 (current conducting elements) will scatter. As a result, when a force that could cause an internal short circuit acts on the terminal plate 601, the conductive material inside the terminal plate 601 can be scattered reliably. There is no particular lower limit on the tensile strength from the standpoint of preventing an internal short circuit. It does not matter how small the tensile strength is so long as the terminal plate 601 can hold its shape. Since the bipolar secondary battery as a whole is covered by an outer covering, the terminal plate can have quite a low tensile strength and still function sufficiently as a terminal plate of the bipolar secondary battery. In other words, it is desirable for the tensile strength of the terminal plate to be low enough for the terminal plate to break immediately when a force large enough to break the outer covering acts on the terminal plate.

In order to obtain such a tensile strength, the proportion of conductive material used in the conductive resin making up the terminal plate 601 is preferably 3 to 90 wt % with respect to the total weight of the terminal plate 601, and still more preferably 10 to 90 wt %. If the amount of conductive material is smaller than 3 wt %, then a sufficient conductivity will not be obtained. Conversely, if the amount of conductive material exceeds 90 wt %, then there will not be enough resin material to support the conductive material and there is a possibility that the terminal plate 601 will not be able to hold its shape.

Depending on the form of the bipolar secondary battery, a portion of 10 to 50 wt % may be preferable from the standpoint of ensuring that the battery structure is sealed. One form of a bipolar secondary battery does not use a collector as an outermost layer and a terminal plate 601 is connected directly to a positive electrode active material layer or a negative electrode active material layer. In such a case, if the proportion of conductive material exceeds 50 wt %, then there is a possibility that resin will not enter a gap between pieces of conductive material and an open gap will remain. Consequently, the sealing performance of the terminal plate will be low and electrolyte could leak out from the positive electrode active material layer or the negative electrode active material layer to which the terminal plate is directly connected.

Also, a volumetric resistance of such a terminal plate is preferably 1 Ω-cm or smaller, and more preferably 0.001 Ω-cm or smaller. The thickness of the terminal plate is preferably 0.1 mm or larger or, more preferably, 1 mm or larger. Such a volumetric resistance is desired in order for the terminal plate to function as necessary, i.e., to enable current to flow readily in a planar direction.

The conductive resin used to make the terminal plate 601 is a resin having a conductive material inserted directly therein or a resin having a conductive material inserted therein along with a binder. The materials and shapes of the resin and the conductive material are basically as explained above in the fourth embodiment. Explanations of the materials and shapes are omitted here to avoid regurgitation of the same information (however, the configuration shown in FIG. 14 in which a conductive material is filled into empty cavities is not included as a possibility for the conductive resin in this embodiment).

The terminal plate 601 is preferably formed by, for example, extrusion or rolling. More specifically, after the resin and the conductive material are melted and mixed together, the terminal plate 601 can be formed by such extrusion or rolling methods as inflation extrusion, T-die extrusion, or calender rolling. The terminal plate is preferably not formed using a method that involves drawing. If the terminal plate is not drawn, then the resin component used will not be pressurized during the forming process and the crystallinity thereof can be held low. Thus, it is possible to provide a highly brittle terminal plate 601.

Figure 23:
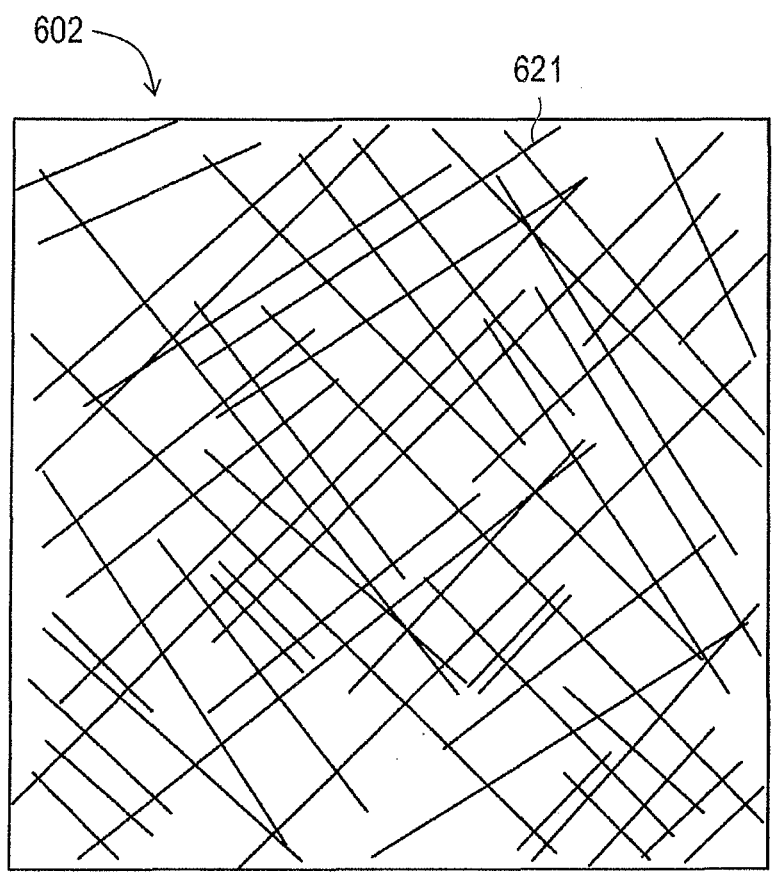
FIG. 23 is an enlarged, partial top plan view showing a surface of a terminal plate according to a variation of the fifth embodiment.

A variation of the fifth embodiment will now be discussed. FIG. 23 is a top plan view of a surface of a terminal plate for explaining a variation of the fifth embodiment. Many scratches 621 are provided in the front and back surfaces of this terminal plate 602. Other than the scratches 621, the terminal plate 602 is the same as the terminal plate 601 of the fifth embodiment.

The scratches 621 comprise countless hair-like scratches formed on the surfaces of the terminal plate 602 after the terminal plate is formed. It is also acceptable for the scratches 621 to be formed on the surface of only one side instead of both sides. Providing scratches 621 enables the terminal plate 602 to break more readily when a strong force acts on the terminal plate 602, thereby increasing the current concentration prevention effect. Although the scratches 621 are depicted in the figure as being randomly arranged, there are no particular limitations regarding the arrangement or number of scratches 621. The scratches 621 can be arranged vertically, horizontally, and diagonally in a random fashion as shown in the figure, or, for example, the scratches 621 can be arranged vertically, horizontally, and/or diagonally in a regular pattern with equal spacing in between. It is also acceptable for the scratches 621 to be arranged only vertically, only horizontally, or only diagonally. Any arrangement is acceptable so long as the terminal plate 602 breaks readily when subjected to a force.

Working Example of the Fifth Embodiment

The structure of the terminal plates is explained below. Otherwise, a bipolar secondary battery sample was fabricated in the same manner as described previously regarding the working examples of the fourth embodiment.

Working Example 5

The manner in which the terminal plates were fabricated will now be explained.

Polyester pellets and carbon black were mixed together, melted, and blended. The blended material was then made into pellets using a granulating machine. The fabricated pellets were made into a conductive film by pressing them using a flat hot press apparatus. The film was formed into terminal plates (by cutting it) and a bipolar secondary battery sample was made using the terminal plates.

Comparative Example 2

A bipolar secondary battery sample was made that was the same as in Working Example 5 except that the terminal plates were made of an aluminum foil.

Evaluation

After the fabricated battery sample was charged, a circular rod having a diameter of 20 mm was used to apply a force to a center portion of the battery such that an internal short circuit occurred. The voltage of the battery sample was then measured. With Working Example 5, substantially no voltage decrease was observed. Meanwhile, a large voltage decrease was observed in Comparative Example 2. Also, Working Example 5 did not exhibit a temperature increase while Comparative Example 2 did exhibit a temperature increase. Based on the results obtained, with a structure according to the fifth embodiment, an internal short circuit does not occur and the temperature of the bipolar secondary battery as a whole does not rise even when a large force is applied to the battery. In short, the battery continues to deliver the same performance as a bipolar secondary battery even after it has been subjected to such a force.

The effects exhibited by the fifth embodiment will now be explained. In the fifth embodiment, since the terminal plate is made to have a smaller tensile strength than a collector, the conductive elements in the terminal plate scatter when the terminal plate is subjected to a force that could cause an internal short circuit. As a result, current cannot flow in the portion where the scattering occurred and a concentration of current is prevented from occurring due to an internal short circuit. Causes for an internal short circuit include, for example, a force acting on the bipolar secondary battery as a whole and penetration of a conductive foreign object into the battery through the outer covering (e.g., a nail piercing the battery). When a force acts on the bipolar secondary battery as a whole, the conductive elements scatter at the portion of the terminal plate where the force occurred. When a foreign object penetrates the battery, the force occurring at the moment of penetration causes the conductive elements of the terminal plate to scatter.

By making the tensile strength of the terminal plate 10 N/mm² or smaller, when a force that could cause an internal short circuit acts from the outside, the terminal plate can be reliably broken in a localized manner and a current concentration caused by an internal short circuit can be prevented.

Since the terminal plate is made of a mixture of resin and a conductive material, the desired tensile strength can be obtained while also securing enough conductivity for the terminal plate to function sufficiently as a terminal plate.

Since the terminal plate is not drawn during the fabrication process, a highly brittle terminal plate can be obtained.

The mass proportion of conductive material with respect to total weight used in the terminal plate is preferably from 3 to 90 wt %. Consequently, the terminal plate can be contrived such it has a sufficient degree of conductivity and also such that the conductive material scatters readily when a force that could cause an internal short circuit acts on the battery.

By making scratches in at least one surface of the terminal plate, the brittleness thereof can be increased such that the conductive material scatters more readily when a force that could cause an internal short circuit acts on the battery.

A bipolar secondary battery according to the fifth embodiment can also be used to make a battery pack, similarly to the first to fourth embodiments. Additionally, the bipolar secondary battery or battery pack can be installed in a vehicle. Furthermore, since such a battery pack or vehicle uses a bipolar secondary battery contrived to suppress or prevent heating caused by an internal short circuit, the battery can be prevented from causing heat damage.

While only selected embodiments have been chosen to illustrate the present invention, it will be apparent to those skilled in the art from this disclosure that various changes and modifications can be made herein without departing from the scope of the invention as defined in the appended claims. For example, a collector can be partitioned into regions with an insulating device provided between adjacent regions as in the first embodiment and a terminal plate can be made in accordance with the fourth or fifth embodiment. Conversely, the collector can be made of resin contrived such that current does not flow readily in a planar direction as in the fourth embodiment, and the terminal plate can be made according to any of the first to third embodiments. Various other combinations can also be used to suppress or interrupt a concentration of current caused by an internal short circuit and prevent a temperature increase from occurring in the bipolar secondary battery. Additionally, in all of the embodiments, the form of the bipolar secondary battery can be modified such that a collector is not used as an outermost layer and a terminal plate is connected directly to a positive electrode active material layer or a negative electrode active material layer.

Also it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bipolar secondary battery comprising:
electric power generating means for generating electric power; and
terminal means for providing connections for the electric power generating means, with the terminal means including an electric current suppressing means for suppressing an electric current occurring when an internal short circuit occurs in the electric power generating means, the current suppressing means being formed by partitioning the at least one terminal plate in a planar direction of the at least one terminal plate in which the planar direction of the at least one terminal plate is perpendicularly oriented with respect to the stacking direction of the electric power generating means, such that the current suppressing means includes one of a current interrupting device that is configured to interrupt an electric current and a current limiting device that is configured to suppress an electric current.

2. A bipolar secondary battery comprising:
an electric power generating unit including a plurality of bipolar electrodes stacked on one another in a stacking direction with an electrolyte layer disposed between the bipolar electrodes and separating the bipolar electrodes, each of the bipolar electrodes including a collector, a positive electrode active material layer formed on a first side surface of the collector, and a negative electrode active material layer formed on a second side surface of the collector; and
a pair of terminal plates with a first terminal plate connected to a first stacking direction facing end of the electric power generating unit and a second terminal plate connected to a second stacking direction facing end of the electric power generating unit,
at least one of the first and second terminal plates including an electric current suppressing device that suppresses an electric current occurring when an internal short circuit occurs in the electric power generating unit, the current suppressing device being formed by partitioning the at least one terminal plate in a planar direction of the at least one terminal plate in which the planar direction of the at least one terminal plate is perpendicularly oriented with respect to the stacking direction of the electric power generating unit, such that the current suppressing device includes one of a current interrupting device that is configured to interrupt an electric current and a current limiting device that is configured to suppress an electric current.

3. The bipolar secondary battery as recited in claim 2, wherein the current suppressing device includes a variable resistor that serves as the current limiting device, with a resistance value of the variable resistor being controlled by an external control device.

4. The bipolar secondary battery as recited in claim 2, wherein
the current suppressing device includes a rectifying element that serves as the current limiting device.

5. The bipolar secondary battery as recited in claim 2, wherein
the current suppressing device includes an on/off circuit that serves as the current interrupting device, with an on/off status of the on/off circuit being controlled by an external control device.

6. The bipolar secondary battery as recited in claim 2, wherein
the current suppressing device includes a fuse that serves as the current interrupting device.

7. The bipolar secondary battery as recited in claim 2, wherein
   at least one of the collectors has an insulating device that partitions the at least one collector in a planar direction of the at least one collector in which the planar direction of the at least one collector is perpendicularly oriented with respect to the stacking direction of the electric power generating unit.

8. The bipolar secondary battery as recited in claim 7, wherein
   the current suppressing device of the at least one terminal plate is provided at a position that is aligned with a position of the insulating device of the at least one collector as viewed along the stacking direction of the electric power generating unit.

9. A battery pack comprising:
   a plurality of the bipolar secondary batteries according to claim 2 connected together in series and/or parallel.

10. A vehicle comprising:
    an electric power source including the bipolar secondary battery according to claim 2.

\* \* \* \* \*